US012794539B2

United States Patent
(12) United States Patent
Zhou et al.

(10) Patent No.: US 12,794,539 B2
(45) Date of Patent: Nov. 10, 2026

(54) ACTIVE BEAM MANAGEMENT, CONFIGURATION, AND CAPABILITY SIGNALING

(71) Applicant: QUALCOMM Incorporated, San Diego, CA (US)

(72) Inventors: Yan Zhou, San Diego, CA (US); Tao Luo, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/468,343

(22) Filed: Sep. 15, 2023

(65) Prior Publication Data

US 2024/0008063 A1 Jan. 4, 2024

Related U.S. Application Data

(63) Continuation of application No. 16/527,273, filed on Jul. 31, 2019, now Pat. No. 11,812,449.

(Continued)

(51) Int. Cl.

*H04B 7/06* (2006.01)
*H04L 5/00* (2006.01)

(Continued)

(52) U.S. Cl.

CPC ....... *H04B 7/06966* (2023.05); *H04L 5/0053* (2013.01); *H04W 36/36* (2013.01);

(Continued)

(58) Field of Classification Search

CPC ..... H04W 72/51; H04W 36/36; H04W 72/02; H04W 72/046; H04W 72/21;

(Continued)

(56) References Cited

U.S. PATENT DOCUMENTS 10,873,386 B2 * 12/2020 Zhou .................... H04W 72/20
11,026,234 B2 * 6/2021 Chen .................... H04B 7/0626

(Continued)

FOREIGN PATENT DOCUMENTS

WO 2017146773 A1 8/2017
WO 2017171953 A1 10/2017

(Continued)

OTHER PUBLICATIONS

International Preliminary Report on Patentability—PCT/US2019/044657, The International Bureau of WIPO—Geneva, Switzerland, Feb. 25, 2021.

(Continued)

*Primary Examiner* — Kenny S Lin
*Assistant Examiner* — Wilfred Thomas
(74) *Attorney, Agent, or Firm* — Harrity & Harrity, LLP

(57) ABSTRACT

Some techniques and apparatuses described herein permit a user equipment (UE) to signal a capability corresponding to a number of active beams (e.g., active uplink beams) to a base station so that the UE may be appropriately configured, and so that the UE may communicate with the base station accordingly. Furthermore, some techniques and apparatuses described herein permit a UE and/or a base station to apply one or more rules and/or conditions to assist with ensuring that a UE capability, corresponding to a number of active beams (e.g., active uplink beams), is not violated, or to prevent the UE from communicating on a beam that is invalid due to a violated UE capability. Furthermore, some techniques and apparatuses described herein permit a UE and a base station to perform a beam management procedure upon beam activation to ensure that a beam is of sufficient quality for communications.

30 Claims, 16 Drawing Sheets

Related U.S. Application Data

(60) Provisional application No. 62/717,618, filed on Aug. 10, 2018.

(51) Int. Cl.
*H04W 36/36* (2009.01)
*H04W 72/02* (2009.01)
*H04W 72/044* (2023.01)
*H04W 72/21* (2023.01)
*H04W 72/51* (2023.01)

(52) U.S. Cl.
CPC ......... *H04W 72/02* (2013.01); *H04W 72/046* (2013.01); *H04W 72/21* (2023.01); *H04W 72/51* (2023.01)

(58) Field of Classification Search
CPC ... H04L 5/0053; H04B 7/06966; H04B 7/088; H04B 7/0695
See application file for complete search history.

(56) References Cited

U.S. PATENT DOCUMENTS 11,026,261 B2 6/2021 Islam et al.
11,239,926 B2* 2/2022 Li .................... H04L 27/2657
11,696,274 B2* 7/2023 Chen .................. H04B 7/06966 370/329
2005/0041641 A1 2/2005 Cooley
2007/0086349 A1 4/2007 Liu
2010/0135215 A1 6/2010 Tang et al.
2011/0110262 A1 5/2011 Yu et al.
2011/0116566 A1 5/2011 Takahashi et al.
2011/0261776 A1 10/2011 Ahn et al.
2012/0052837 A1* 3/2012 Reich .................. H04W 4/90 455/404.1
2012/0202431 A1 8/2012 Hawryluck et al.
2014/0161084 A1* 6/2014 Yang .................. H04W 72/23 370/329
2014/0177601 A1 6/2014 Nishio et al.
2014/0185530 A1 7/2014 Kuchibhotla et al.
2014/0328228 A1 11/2014 Park et al.
2015/0139001 A1 5/2015 Xue et al.
2016/0191375 A1 6/2016 Gopala Krishnan et al.
2016/0218788 A1* 7/2016 Yum .................. H04L 1/1812
2017/0207843 A1* 7/2017 Jung .................. H04W 74/006
2017/0223690 A1 8/2017 Zeng et al.
2018/0034515 A1 2/2018 Guo et al.
2018/0084542 A1* 3/2018 Fujishiro ............... H04L 1/1812
2018/0103407 A1 4/2018 Nagaraja et al.
2018/0123648 A1 5/2018 Nagaraja et al.
2018/0167883 A1* 6/2018 Guo .................. H04B 7/0617
2018/0206132 A1 7/2018 Guo et al.
2018/0219606 A1 8/2018 Ng et al.
2018/0227094 A1 8/2018 Liu et al.
2018/0227772 A1 8/2018 Yu et al.
2018/0242321 A1 8/2018 Takeda et al.
2018/0288753 A1 10/2018 Kishiyama et al.
2018/0309496 A1 10/2018 Lee et al.
2018/0324678 A1 11/2018 Chen et al.
2019/0069285 A1* 2/2019 Chandrasekhar ..... H04W 72/23
2019/0074880 A1 3/2019 Frenne et al.
2019/0075526 A1 3/2019 Nagaraj et al.
2019/0081688 A1 3/2019 Deenoo et al.
2019/0141693 A1 5/2019 Guo et al.
2019/0174346 A1 6/2019 Murray et al.
2019/0199412 A1* 6/2019 Koskela ............. H04B 7/06952
2019/0253108 A1 8/2019 Zhang et al.
2019/0335430 A1 10/2019 Ljung
2019/0357177 A1* 11/2019 Kuang .................. H04W 88/04
2019/0379441 A1 12/2019 Priyanto et al.
2019/0394664 A1 12/2019 Sun
2020/0021337 A1* 1/2020 Wang .................. H04B 7/0417
2020/0028609 A1* 1/2020 Ahn .................. H04L 1/00
2020/0045722 A1 2/2020 Bae et al.
2020/0053717 A1 2/2020 Zhou et al.
2020/0059871 A1 2/2020 Ryu et al.
2020/0068416 A1 2/2020 Kang et al.
2020/0068548 A1 2/2020 Guan et al.
2020/0068557 A1 2/2020 Lee et al.
2020/0163059 A1 5/2020 Zhang et al.
2020/0163155 A1 5/2020 Lee et al.
2020/0245173 A1 7/2020 Kusashima et al.
2020/0245200 A1 7/2020 Xiong et al.
2020/0252951 A1 8/2020 Frenne et al.
2020/0274666 A1* 8/2020 Zhang .................. H04B 7/086
2020/0296715 A1 9/2020 Wang et al.
2020/0304192 A1* 9/2020 Yum .................. H04L 1/0013
2020/0305182 A1 9/2020 Zhou et al.
2020/0351860 A1* 11/2020 Chen .................. H04W 76/19
2020/0358577 A1 11/2020 Takeda et al.
2020/0366445 A1 11/2020 Takeda et al.
2021/0014897 A1 1/2021 Liu et al.
2021/0058932 A1 2/2021 Takeda et al.
2021/0058967 A1 2/2021 Oteri et al.
2021/0067289 A1 3/2021 Zhu et al.
2021/0092696 A1* 3/2021 Ko .................. H04W 76/27
2021/0120536 A1 4/2021 Gao et al.
2021/0136768 A1 5/2021 Kang et al.
2021/0144703 A1 5/2021 Jung et al.
2021/0259004 A1 8/2021 Takeda et al.
2021/0314128 A1* 10/2021 Li .................. H04L 5/0096
2021/0315041 A1 10/2021 Matsumura et al.
2021/0321355 A1 10/2021 Gao et al.
2021/0345390 A1 11/2021 Okamura et al.
2021/0376908 A1* 12/2021 Sun .................. H04W 16/28
2022/0287027 A1 9/2022 Zhou et al.
2023/0188285 A1 6/2023 Wang et al.

FOREIGN PATENT DOCUMENTS

WO 2017214969 A1 12/2017
WO 2018031908 A1 2/2018
WO 2018127560 A1 7/2018

OTHER PUBLICATIONS

International Search Report and Written Opinion—PCT/US2019/044657—ISA/EPO—Jan. 8, 2020.
Partial International Search Report—PCT/US2019/044657—ISA/EPO—Oct. 28, 2019.
Qualcomm: "Beam Management for NR", 3GPP TSG-RAN WG1 #91, R1-1720662, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051370124, 10 Pages.
Qualcomm Incorporated: "Remaining Details on QCL", 3GPP TSG RAN WG1 Meeting #91, 3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), pp. 1-9, XP051370133, sections 1-3, the whole document.
Taiwan Search Report—TW108127360—TIPO—Aug. 9, 2022.
Taiwan Search Report—TW108127360—TIPO—Feb. 22, 2023.

* cited by examiner

ACTIVE BEAM MANAGEMENT, CONFIGURATION, AND CAPABILITY SIGNALING

CROSS-REFERENCE TO RELATED APPLICATIONS

This application is a continuation of U.S. patent application Ser. No. 16/527,273, filed Jul. 31, 2019, entitled "ACTIVE BEAM MANAGEMENT, CONFIGURATION, AND CAPABILITY SIGNALING," which claims priority to U.S. Provisional Patent Application No. 62/717,618, filed on Aug. 10, 2018, entitled "ACTIVE BEAM MANAGEMENT, CONFIGURATION, AND CAPABILITY SIGNALING," which are hereby expressly incorporated by reference herein.

BACKGROUND

Field

Aspects of the present disclosure generally relate to wireless communication and to techniques and apparatuses for active beam management, configuration, and capability signaling.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BS s) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Beamforming may require complex processing at a UE, and different types of UEs may have different capabilities with respect to beamforming, such as a number of active uplink beams and/or active downlink beams concurrently supported by the UE. Because different UEs may have different capabilities regarding a number of active beams, a UE may need to signal a capability of the UE to a base station to enable the base station to appropriately configure and communicate with the UE. Furthermore, if the UE is limited in a capability regarding a number of active beams, then certain rules may need to be applied by the UE and/or the base station to ensure that the capability of the UE is not violated. Furthermore, when switching beams used for communications, the UE and/or the base station may need to ensure that the UE capability is not violated and that the beam(s) used for communication are of sufficient quality.

Some techniques and apparatuses described herein permit a UE to signal a capability corresponding to a number of active beams (e.g., active uplink beams) to a base station so that the UE may be appropriately configured, and so that the UE may communicate with the base station accordingly. Furthermore, some techniques and apparatuses described herein permit a UE and/or a base station to apply one or more rules and/or conditions to assist with ensuring that a UE capability, regarding a number of active beams (e.g., active uplink beams), is not violated, or to prevent the UE from communicating on a beam that is invalid due to a violated UE capability. Furthermore, some techniques and apparatuses described herein permit a UE and a base station to perform a beam management procedure upon beam activation to ensure that a beam is of sufficient quality for communications.

In an aspect of the disclosure, a method, a user equipment (UE), an apparatus, and a computer program product are provided.

In some aspects, the method may be performed by a UE. The method may include determining that the UE has an uplink capability corresponding to a number of active uplink beams required for the UE, wherein the uplink capability corresponds to support for: at least one first active uplink beam for uplink control and uplink data, and a second active uplink beam for uplink control; and signaling the uplink capability to a base station.

In some aspects, the UE may include a memory and one or more processors operatively coupled to the memory. The memory and the one or more processors may be configured to determine that the UE has an uplink capability corresponding to a number of active uplink beams required for the UE, wherein the uplink capability corresponds to support for: at least one first active uplink beam for uplink control and uplink data, and a second active uplink beam for uplink control; and signal the uplink capability to a base station.

In some aspects, the apparatus may include means for determining that the apparatus has an uplink capability corresponding to a number of active uplink beams required for the apparatus, wherein the uplink capability corresponds to support for: at least one first active uplink beam for uplink control and uplink data, and a second active uplink beam for uplink control; and means for signaling the uplink capability to a base station.

In some aspects, the computer program product may include a non-transitory computer-readable medium storing one or more instructions. The one or more instructions, when executed by one or more processors of a UE, may cause the one or more processors to determine that the UE has an uplink capability corresponding to a number of active uplink beams required for the UE, wherein the uplink capability corresponds to support for: at least one first active uplink beam for uplink control and uplink data, and a second active uplink beam for uplink control; and signal the uplink capability to a base station.

In some aspects, the method may be performed by a UE. The method may include receiving an indication to reselect an active source beam; reselecting an active dependent beam, that depends on the active source beam such that a beam identifier of the active dependent beam is updated when a beam identifier of the active source beam changes, based at least in part on the indication; and communicating using the reselected active dependent beam based at least in part on reselecting the active dependent beam.

In some aspects, the UE may include a memory and one or more processors operatively coupled to the memory. The memory and the one or more processors may be configured to receive an indication to reselect an active source beam; reselect an active dependent beam, that depends on the active source beam such that a beam identifier of the active dependent beam is updated when a beam identifier of the active source beam changes, based at least in part on the indication; and communicate using the reselected active dependent beam based at least in part on reselecting the active dependent beam.

In some aspects, the apparatus may include means for receiving an indication to reselect an active source beam; means for reselecting an active dependent beam, that depends on the active source beam such that a beam identifier of the active dependent beam is updated when a beam identifier of the active source beam changes, based at least in part on the indication; and means for communicating using the reselected active dependent beam based at least in part on reselecting the active dependent beam.

In some aspects, the computer program product may include a non-transitory computer-readable medium storing one or more instructions. The one or more instructions, when executed by one or more processors of a UE, may cause the one or more processors to receive an indication to reselect an active source beam; reselect an active dependent beam, that depends on the active source beam such that a beam identifier of the active dependent beam is updated when a beam identifier of the active source beam changes, based at least in part on the indication; and communicate using the reselected active dependent beam based at least in part on reselecting the active dependent beam.

In some aspects, the method may be performed by a UE. The method may include determining that the UE has a minimum capability corresponding to a number of active uplink beams supported by the UE; and signaling the minimum capability to a base station.

In some aspects, the UE may include a memory and one or more processors operatively coupled to the memory. The memory and the one or more processors may be configured to determine that the UE has a minimum capability corresponding to a number of active uplink beams supported by the UE; and signal the minimum capability to a base station.

In some aspects, the apparatus may include means for determining that the apparatus has a minimum capability corresponding to a number of active uplink beams supported by the apparatus; and means for signaling the minimum capability to a base station.

In some aspects, the computer program product may include a non-transitory computer-readable medium storing one or more instructions. The one or more instructions, when executed by one or more processors of a UE, may cause the one or more processors to determine that the UE has a minimum capability corresponding to a number of active uplink beams supported by the UE; and signal the minimum capability to a base station.

In some aspects, the method may be performed by a UE. The method may include receiving an indication to reselect an active source beam; reselecting an active dependent beam, that depends on the active source beam, based at least in part on the indication; and communicating using the reselected active dependent beam based at least in part on reselecting the active dependent beam.

In some aspects, the UE may include a memory and one or more processors operatively coupled to the memory. The memory and the one or more processors may be configured to receive an indication to reselect an active source beam; reselect an active dependent beam, that depends on the active source beam, based at least in part on the indication; and communicate using the reselected active dependent beam based at least in part on reselecting the active dependent beam.

In some aspects, the apparatus may include means for receiving an indication to reselect an active source beam; means for reselecting an active dependent beam, that depends on the active source beam, based at least in part on the indication; and means for communicating using the reselected active dependent beam based at least in part on reselecting the active dependent beam.

In some aspects, the computer program product may include a non-transitory computer-readable medium storing one or more instructions. The one or more instructions, when executed by one or more processors of a UE, may cause the one or more processors to receive an indication to reselect an active source beam; reselect an active dependent beam, that depends on the active source beam, based at least in part on the indication; and communicate using the reselected active dependent beam based at least in part on reselecting the active dependent beam.

In some aspects, the method may be performed by a UE. The method may include receiving an indication to activate a beam; determining that a beam management configuration is outdated for the UE; and performing a beam management procedure, during a time period that follows the indication, based at least in part on receiving the indication and determining that the beam management configuration is outdated.

In some aspects, the UE may include a memory and one or more processors operatively coupled to the memory. The memory and the one or more processors may be configured to receive an indication to activate a beam; determine that a beam management configuration is outdated for the UE; and perform a beam management procedure, during a time period that follows the indication, based at least in part on receiving the indication and determining that the beam management configuration is outdated.

In some aspects, the apparatus may include means for receiving an indication to activate a beam; means for determining that a beam management configuration is outdated for the apparatus; and means for performing a beam management procedure, during a time period that follows the indication, based at least in part on receiving the indication and determining that the beam management configuration is outdated.

In some aspects, the computer program product may include a non-transitory computer-readable medium storing one or more instructions. The one or more instructions, when executed by one or more processors of a UE, may cause the one or more processors to receive an indication to activate a beam; determine that a beam management configuration is outdated for the UE; and perform a beam management procedure, during a time period that follows the indication, based at least in part on receiving the indication and determining that the beam management configuration is outdated.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
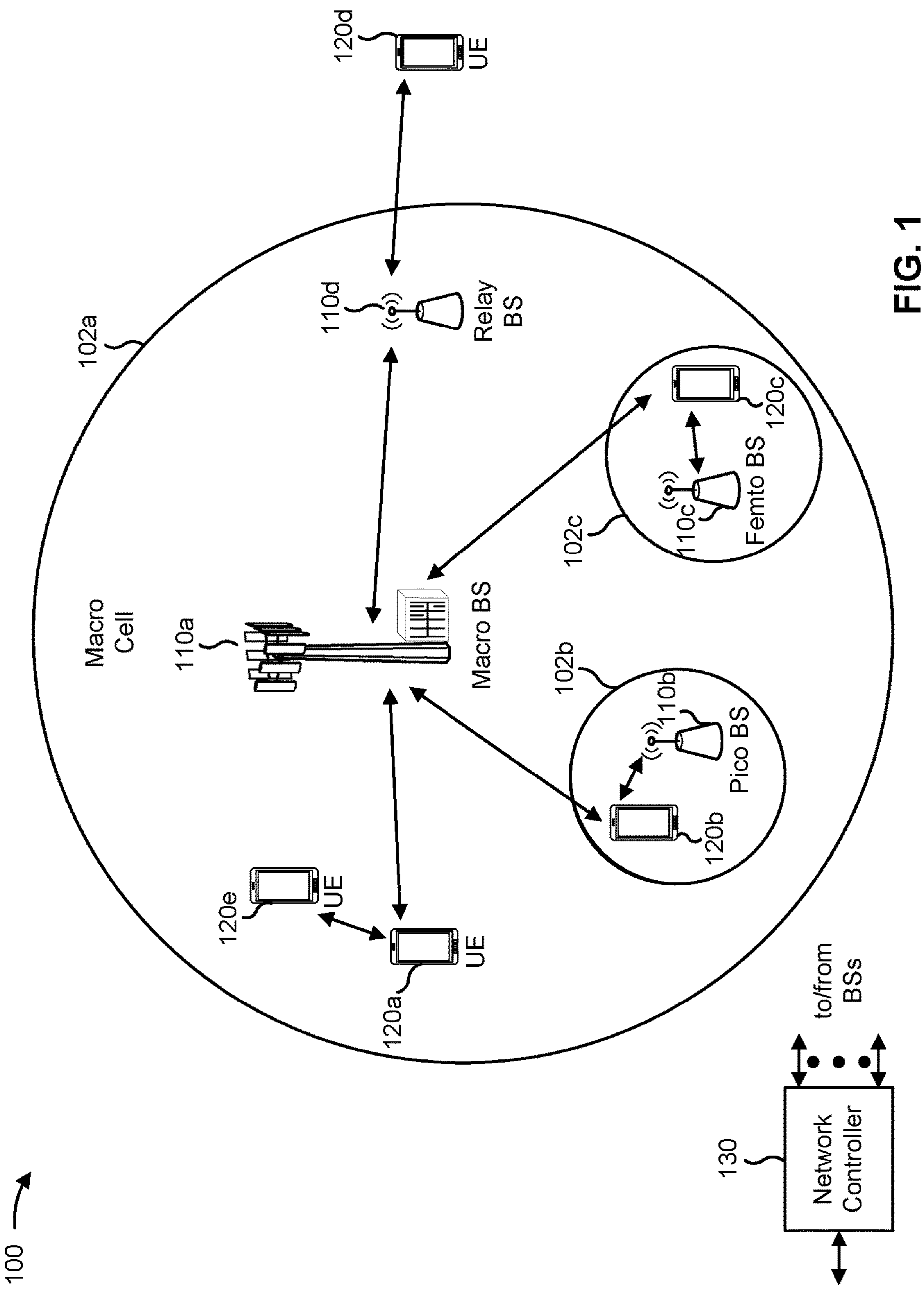
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BS s 110 (shown as BS 110*a*, BS 110*b*, BS 110*c*, and BS 110*d*) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*, 120*d*, 120*e*, and/or the like) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another (e.g., as shown by UEs 120*a* and 120*e*) in addition to communicating with the scheduling entity.

Thus, in a wireless communication network with a scheduled access to time— frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are may differ from what is described with regard to FIG. 1.

Figure 2:
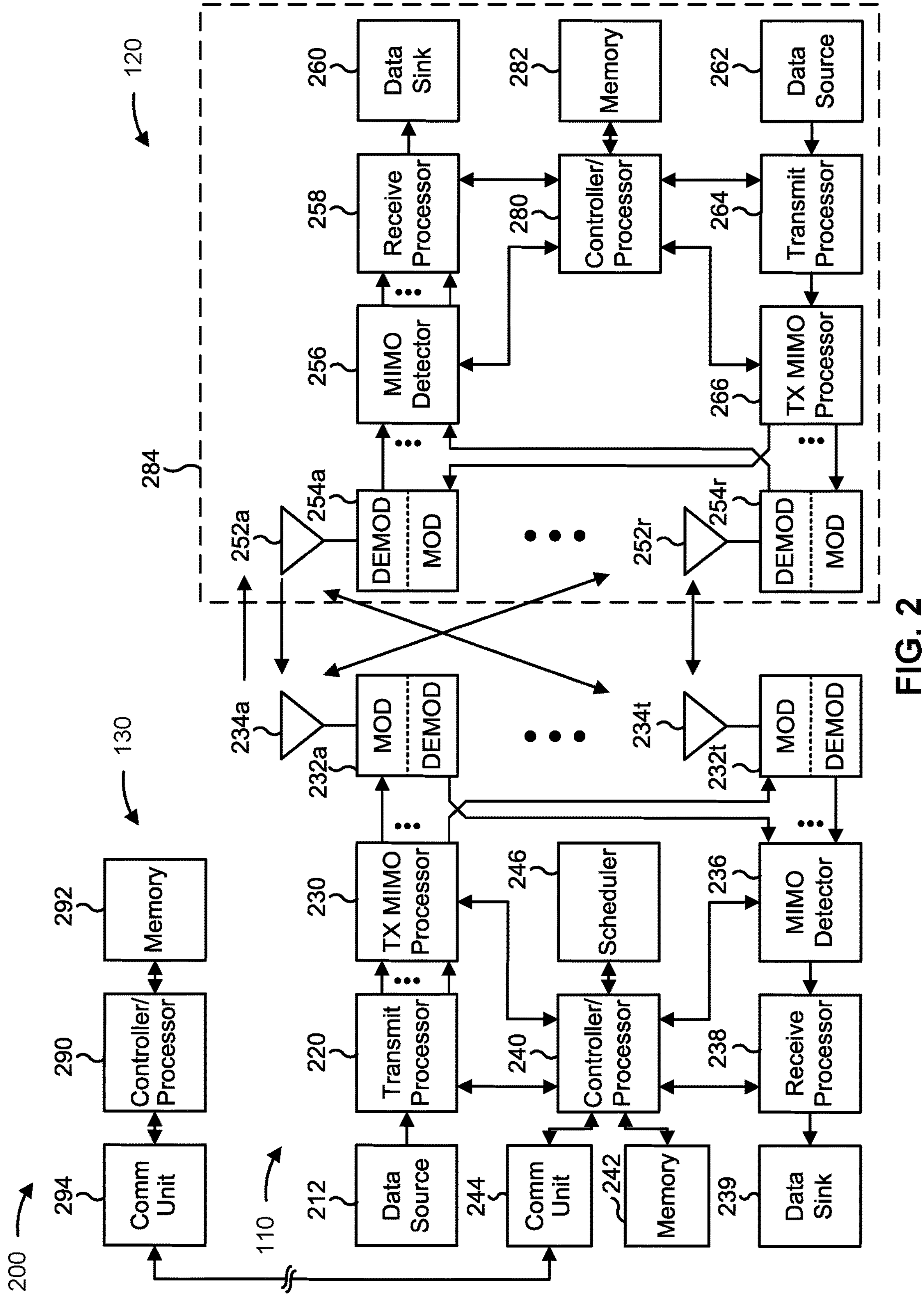
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) S) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with active beam management, configuration, and capability signaling, as described in more detail elsewhere herein. For example, controller/processor 240 of base station 110, controller/processor 280 of UE 120, and/or any other component(s) of FIG. 2 may perform or direct operations of, for example, method 1000 of FIG. 10, method 1100 of FIG. 11, method 1200 of FIG. 12, method 1300 of FIG. 13, method 1400 of FIG. 14, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

In 5G and other types of radio access technologies (RATs), beamforming may be used for communications between a UE 120 and a base station 110, such as for millimeter wave communications and/or the like. Communicating using beamforming may require complex processing at the UE 120, and different types of UEs 120 may have different capabilities with respect to beamforming, such as a number of active beams (e.g., uplink beams and/or downlink beams) concurrently supported by the UE 120 (e.g., a number of active beams that the UE 120 is capable of using to communicate at the same time). Because different UEs 120 may have different capabilities regarding a number of active beams, a UE 120 may need to signal a specific capability of that UE 120 to a base station 110 to enable the base station 110 to appropriately configure and communicate with the UE 120.

Furthermore, if the UE 120 is limited in a capability regarding a number of active beams (e.g., uplink beams, downlink beams, control beams, data beams, and/or the like), then certain rules may need to be applied by the UE 120 and/or the base station 110 to ensure that the capability of the UE 120 is not violated. For example, the UE 120 and/or the base station 110 may need to ensure that the UE 120 is not configured to communicate using more active beams than the UE 120 is capable of supporting. When switching beams used for communications, the UE 120 and/or the base station 110 may need to not only ensure that the capability of the UE 120 is not violated, but may also need to ensure that the beam(s) used for communication are of sufficient quality for communications.

Some techniques and apparatuses described herein permit a UE 120 to signal a capability corresponding to a number of active beams (e.g., active uplink beams) to a base station 110 so that the UE 120 may be appropriately configured, and so that the UE 120 may communicate with the base station 110 accordingly. Furthermore, some techniques and apparatuses described herein permit a UE 120 and/or a base station 110 to apply one or more rules and/or conditions to assist with ensuring that a UE capability, regarding a number of active beams (e.g., active uplink beams), is not violated, or to prevent the UE 120 from communicating on a beam that is invalid due to a violated UE capability. Furthermore, some techniques and apparatuses described herein permit a UE 120 and a base station 110 to perform a beam management procedure upon beam activation to ensure that a beam is of sufficient quality for communications. Additional details are described below.

Figure 3:
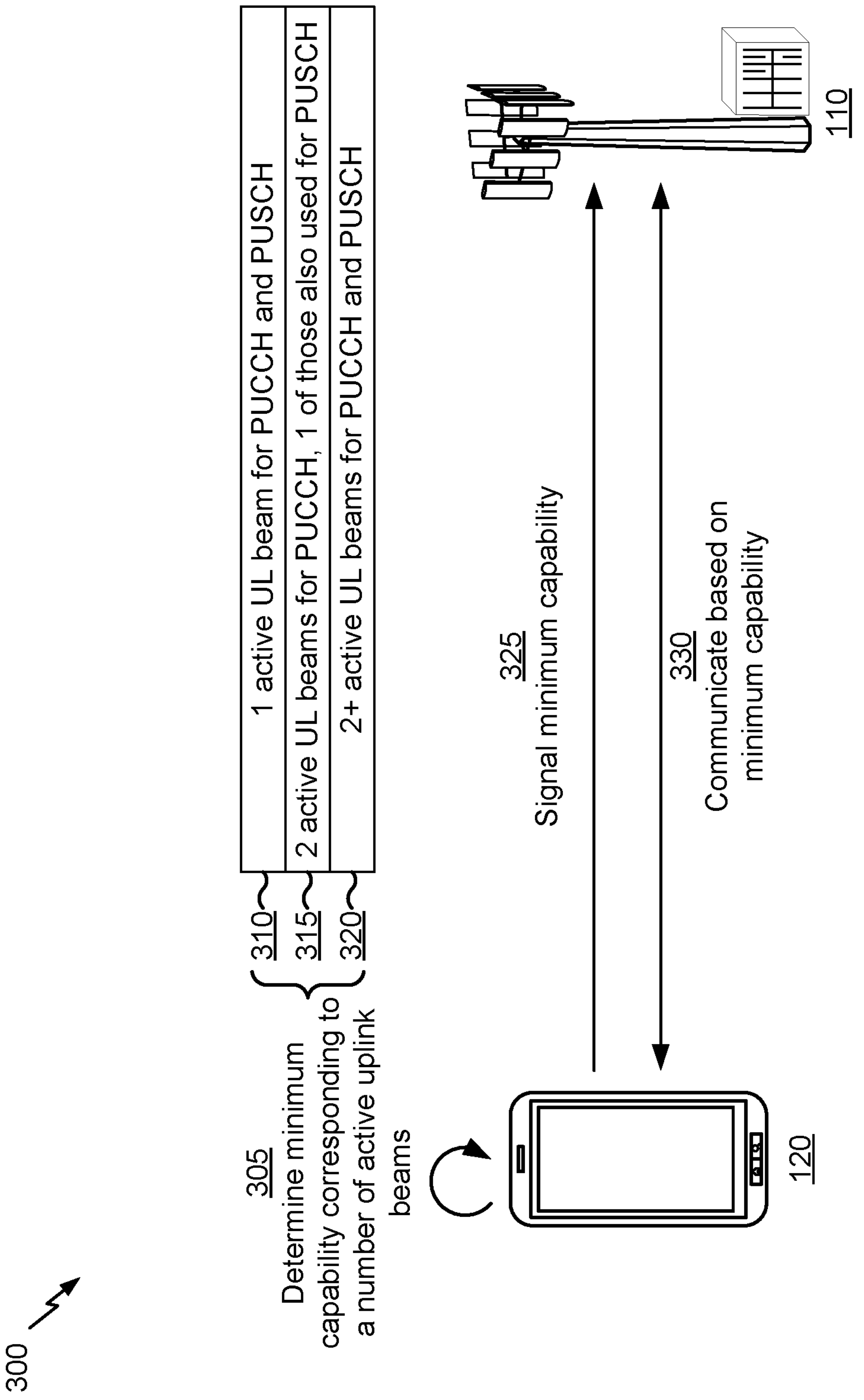
FIGS. 3-9 are diagrams illustrating examples of active beam management, configuration, and capability signaling.

FIG. 3 is a diagram illustrating an example 300 of active beam management, configuration, and capability signaling. Example 300 relates to capability signaling for a minimum capability regarding a number of active uplink beams required for a UE.

As shown by reference number 305, a UE 120 may determine that the UE 120 has a minimum capability corresponding to a number of active uplink beams required for the UE 120. In some aspects, the minimum capability may be predefined according to a wireless communication standard, and may dictate a minimum capability required for UEs 120 that support the wireless communication standard (e.g., that can communicate according to the wireless communication standard). In some aspects, information that identifies the predefined minimum capability may be stored and/or hard-coded in memory of the UE 120. The UE 120 may determine whether the capability of the UE 120 corresponding to a number of active uplink beams matches the predefined minimum capability, or whether the UE 120 has a different minimum capability than the predefined minimum capability. In some aspects, an uplink beam may be at least partially defined by a spatial relation that indicates a directionality and/or characteristic of the uplink beam, whereas a downlink beam may be at least partially defined by a transmission configuration indicator (TCI) state that indicates a directionality and/or characteristic of the downlink beam.

In some aspects, the minimum capability corresponding to the number of active uplink beams may include an uplink beam determined based at least in part on a random access procedure in addition to one or more active uplink beams determined in a connected mode. Thus, in some aspects, the uplink beam determined based at least in part on the random access procedure may count toward the number of active uplink beams for the minimum capability. In some aspects, the minimum capability corresponding to the number of active uplink beams may exclude an uplink beam determined based at least in part on a random access procedure in addition to one or more active uplink beams determined in a connected mode. Thus, in some aspects, the uplink beam determined based at least in part on the random access procedure may not count toward the number of active uplink beams for the minimum capability.

As shown by reference number 310, in some aspects, the minimum capability corresponding to the number of active uplink beams may be a single active uplink beam (e.g., having a single spatial relation). This single active uplink beam may be configured for and/or used for both control (e.g., via a physical uplink control channel (PUCCH)) and data (e.g., via a physical uplink shared channel (PUSCH)). In this case, the single active uplink beam may be configured for and/or used for all uplink control resources (e.g., PUCCH resources) and all uplink data resources (e.g., PUSCH resources). For example, all uplink control resources and all uplink data resources may be scheduled and/or assigned for the UE 120 (and/or used for transmission by the UE 120) only on the single active uplink beam. In the case of a single active uplink beam, a common spatial relation may be configured for and/or used for transmission across all uplink control resources and all uplink data resources. In this case, the UE 120 may support a single active uplink data beam (e.g., which may also be configured for and/or used for control).

As shown by reference number 315, in some aspects, the minimum capability corresponding to the number of active uplink beams may be two active uplink beams (e.g., having two different spatial relations), where a first active uplink beam (e.g., having a first spatial relation) is configured for and/or used for both control (e.g., via a PUCCH) and data (e.g., via a PUSCH) and a second active uplink beam (e.g., having a second spatial relation) is configured and/or used only for control (and not data). Thus, there may be two active uplink control beams, and one of those active uplink control beams may also be used as an active uplink data beam. In this case, either of the two active uplink beams may be configured for and/or used for uplink control resources (e.g., PUCCH resources), and one of those two active uplink beams may be configured for and/or used for all uplink data resources (e.g., PUSCH resources). For example, uplink control resources may be scheduled, assigned, configured for, and/or used for transmission on either of the two active uplink beams, whereas all uplink data resources must be scheduled, assigned, configured for, and/or used for transmission on only one of those two active uplink beams (e.g., only one of the two beams may be activated for uplink data). In this case, two different spatial relations may be configured for and/or used for transmission across different uplink control resources, whereas only one of the two spatial relations may be configured for and/or used for transmission of uplink data resources. In this case, the UE 120 may support a single active uplink data beam (e.g., which may also be configured for and/or used for control).

As shown by reference number 320, in some aspects, the minimum capability corresponding to the number of active uplink beams may be two or more active uplink beams (e.g., having respective two or more different spatial relations) capable of being configured for and/or used for both control (e.g., via a PUCCH) and data (e.g., via a PUSCH). For example, each of the two or more active uplink beams may be configured for and/or used for both control and data, in some aspects. In this case, any one of the active uplink beams may be configured for and/or used for both uplink control resources (e.g., PUCCH resources) and uplink data resources (e.g., PUSCH resources). For example, uplink control resources and/or uplink data resources may be scheduled, assigned, configured for, and/or used for transmission on any one of the two or more active uplink beams. In this case, two or more different spatial relations, corresponding to the two or more active uplink beams, may be configured for and/or used for transmission across different uplink control resources and different uplink data resources. In this case, the UE 120 may support multiple active uplink data beams (e.g., any one or more of which may also be configured for and/or used for control).

As shown by reference number 325, in some aspects, the UE 120 may signal the minimum capability, corresponding to the number of active uplink beams, to a base station 110. In some aspects, this minimum capability may be implicitly signaled. For example, the UE 120 may signal (e.g., in a capability report) that the UE 120 has a minimum capability regarding a number of active downlink beams required for the UE 120. In some aspects, when the UE 120 has such a minimum capability corresponding to a number of active downlink beams, this may imply that the UE 120 also has a minimum capability corresponding to a number of active uplink beams. Thus, a minimum capability corresponding to a number of active downlink beams and a minimum capability corresponding to a number of active uplink beams may be jointly signaled. As used herein, a capability may refer to a capability of the UE 120 reported to the base station 110, such as in a UE capability report.

Similar to the minimum capability for the number of active uplink beams, the minimum capability for the number of active downlink beams may be predefined according to a wireless communication standard, and may dictate a minimum capability required for UEs 120 that support the wireless communication standard. Furthermore, information that identifies the predefined minimum capability may be stored and/or hard-coded in memory of the UE 120. The UE 120 may determine whether the capability of the UE 120 corresponding to a number of active downlink beams matches the predefined minimum capability, or whether the UE 120 has a different capability than the predefined minimum capability. In some aspects, the minimum capability corresponding to the number of active downlink beams may be two active downlink beams, where a first active downlink beam (e.g., having a first TCI state) is configured for and/or used for both control (e.g., via a physical downlink control channel (PDCCH)) and data (e.g., via a physical downlink shared channel (PDSCH)) and a second active downlink beam (e.g., having a second TCI state) is configured and/or used only for control (and not data).

Alternatively, in some aspects, the minimum capability corresponding to the number of active uplink beams may be explicitly signaled, and/or may be signaled separately from the minimum capability corresponding to the number of active downlink beams. For example, the UE 120 may signal the minimum capability for the number of active uplink beams in a first field and/or using a first set of bits (e.g., in a capability report), and may signal the minimum capability for the number of active downlink beams in a second field and/or using a second set of bits (e.g., in a capability report).

As shown by reference number 330, the UE 120 and the base station 110 may communicate based at least in part on the minimum capability. For example, the base station 110 may assign, schedule, and/or receive information on uplink control resources and/or uplink data resources according to the minimum capability. Additionally, or alternatively, the UE 120 may be assigned with, scheduled with, and/or may transmit information on uplink control resources and/or uplink data resources according to the minimum capability. In some aspects, the uplink control resources and/or the uplink data resources may be assigned, scheduled, transmitted, and/or received on one or more active uplink beams (e.g., control beams and/or data beams) according to the minimum capability. Additionally, or alternatively, the UE 120 and/or the base station 110 may determine one or more beams to be activated, selected, reselected, configured for, and/or used for transmissions (e.g., control transmissions and/or data transmissions) based at least in part on the minimum capability, as described in more detail below. In this way, the base station 110 and/or the UE 120 may ensure that a minimum capability of the UE 120, with respect to a number of uplink beams permitted to be concurrently active, is not violated (or at least reduce a likelihood that the minimum capability is violated), thereby reducing errors and improving performance.

As indicated above, FIG. 3 is provided as an example. Other examples may differ from what is described with respect to FIG. 3.

Figure 4:
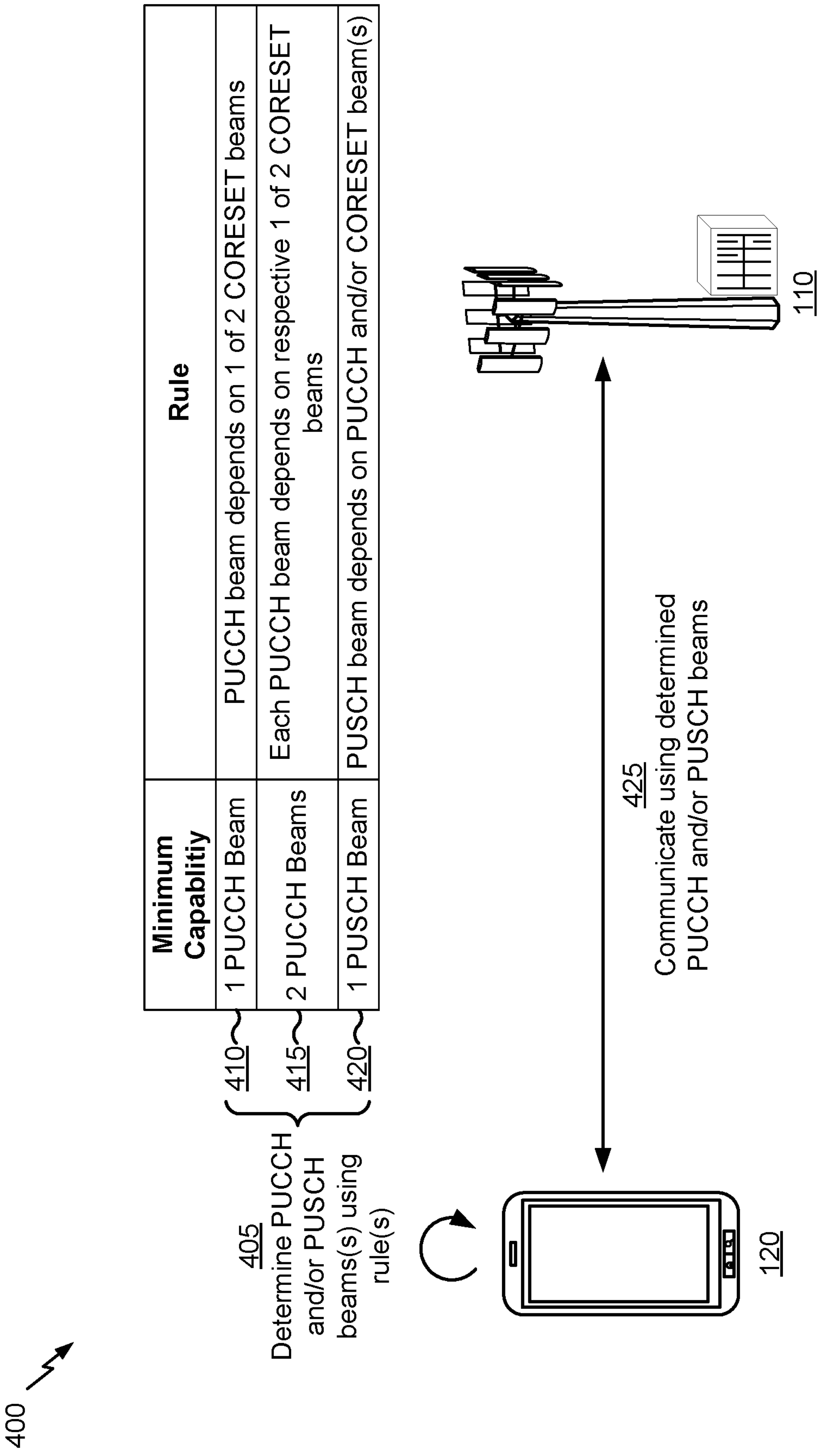

FIG. 4 is a diagram illustrating an example 400 of active beam management, configuration, and capability signaling. Example 400 relates to uplink beam determination and/or selection when a UE has a minimum capability regarding a number of active uplink beams required for the UE (e.g., to support a wireless communication standard).

As shown by reference number 405, a UE 120, having a minimum capability corresponding to a number of active uplink beams, may determine one or more active uplink beams to be configured for and/or used for uplink transmissions. The one or more active uplink beams may include, for example, uplink control beams and/or uplink data beams. In some aspects, the UE 120 may determine the active uplink beam(s) based at least in part on a minimum capability of the UE 120. Additionally, or alternatively, the UE 120 may determine the active uplink beam(s) based at least in part on a rule and/or a condition, as described below. The rule and/or condition may be predefined according to a wireless communication standard, may be stored and/or hard coded in memory of the UE 120, may be indicated to the UE 120 by the base station 110, and/or the like. In some aspects, the UE 120 may determine the active uplink beam(s) based at least in part on an instruction from a base station 110, as described in more detail in connection with FIG. 5.

As shown by reference number 410, in some aspects, the minimum capability may require a single active uplink beam for all control resources (e.g., PUCCH resources). For example, this may be the case when the UE 120 is required to have a single active uplink beam for all uplink control resources and all uplink data resources, as described above in connection with reference number 310 of FIG. 3. In this case, the single active uplink beam (e.g., shown as a PUCCH beam, but which may also be configured for and/or used for a PUSCH) may depend on one of two active downlink control beams (e.g., shown as control resource set (CORESET) beams, which may be configured for and/or used for a CORESET and/or a PDCCH) required for the UE 120 for a minimum capability regarding a number of active downlink beams. As described above in connection with FIG. 3, the minimum capability corresponding to the number of active downlink beams may be two active downlink beams, where a first active downlink beam is configured for both control and data, and a second active downlink beam is configured and/or used only for control (and not data). Thus, the single active uplink beam may depend on one of the two active downlink beams. When a first beam depends on a second beam, a beam identifier (e.g., a TCI state for a downlink beam or a spatial relation for an uplink beam) of the first beam may be updated when a beam identifier of the second beam changes (e.g., due to an instruction from a base station 110, a beam management procedure, and/or the like). In some aspects, the beam identifier of the first beam may be updated to match the beam identifier of the second beam. In some aspects, a beam dependency may be predefined according to a rule in a wireless communication standard.

As shown in FIG. 4, in some aspects, the single active uplink beam may depend on one of the two active downlink beams according to a rule and/or a condition. In some aspects, the rule and/or condition may indicate that a spatial relation of the single active uplink beam maps to a TCI state of whichever one of the two active downlink control beams satisfies a condition (e.g., the spatial relation and the TCI state have the same spatial relation source reference signal). The condition may be used to identify the active downlink control beam having the TCI state to which the spatial relation of the single active uplink beam maps. For example, the condition may identify the active downlink control beam (e.g., of the two active downlink control beams) with a lower downlink control identifier (e.g., a lower CORESET ID), a higher downlink control identifier (e.g., a higher CORESET ID), a lower beam identifier, a higher beam identifier, a lower TCI state identifier, a higher TCI state identifier, and/or the like. Additionally, or alternatively, the condition may indicate that the active downlink control beam, to which the single active uplink beam maps, must be in a current bandwidth part (e.g., an active bandwidth part being used by the UE 120 to communicate).

As shown by reference number 415, in some aspects, the minimum capability may require two active uplink beams for control resources (e.g., PUCCH resources). For example, this may be the case when the UE 120 is required to have two active uplink beams for all uplink control resources, and one of those beams is configured for and/or used for all uplink data resources, as described above in connection with reference number 315 of FIG. 3. In this case, each of the two active uplink beams (e.g., shown as PUCCH beams, but one of which may also be configured for and/or used for a PUSCH) may depend on a respective one of the two active downlink control beams (e.g., shown as CORESET beams, which may be configured for and/or used for a CORESET and/or a PDCCH) required for the UE 120 for a minimum capability corresponding to a number of active downlink beams. Thus, a first active uplink beam, of the two active uplink beams, may depend on a first active downlink control beam, of the two active downlink control beams, and a second active uplink beam, of the two active uplink beams, may depend on a second active downlink control beam, of the two active downlink control beams. In some aspects, such a dependency (e.g., uplink beams depending on downlink beams) may be permitted only when the UE has a capability of beam correspondence between uplink beams and downlink beams. Otherwise, such a dependency may not be permitted when the UE 120 does not have a capability of beam correspondence between uplink beams and downlink beams.

As shown in FIG. 4, in some aspects, each of the two active uplink beams may depend on a respective one of the two active downlink control beams according to a rule and/or a condition. In some aspects, the rule and/or condition may indicate that a spatial relation, of whichever one of the two active uplink beams satisfies a first condition, maps to a TCI state of whichever one of the two active downlink control beams satisfies a second condition. The condition may be used to identify the active uplink beam and the active downlink control beam that map to one another (e.g., for which the spatial relation, of the active uplink beam, and the TCI state, of the active downlink control beam, have the same spatial relation source reference signal).

For example, the condition may identify the active uplink beam (e.g., of the two active uplink beams) with a lower spatial relation identifier, a higher spatial relation identifier, a lower beam identifier, a higher beam identifier, a lower uplink control identifier (e.g., a lower PUCCH identifier), a higher uplink control identifier (e.g., a higher PUCCH identifier) and/or the like. Additionally, or alternatively, the condition may identify the active downlink control beam (e.g., of the two active downlink control beams) with a lower downlink control identifier (e.g., a lower CORESET ID), a higher downlink control identifier (e.g., a higher CORESET ID), a lower beam identifier, a higher beam identifier, a lower TCI state identifier, a higher TCI state identifier, and/or the like. As an example, the condition may indicate that the active uplink beam (of the two active uplink beams) associated with a lower spatial relation identifier maps to the active downlink control beam (of the two active downlink control beams) associated with a lower downlink control identifier. In this case, the other of the two active uplink beams may map to the other of the two active downlink control beams. Additionally, or alternatively, the condition may indicate that the active downlink control beam, to which the single active uplink beam maps, must be in a current bandwidth part.

As shown by reference number 420, in some aspects, the minimum capability may require a single active uplink beam for all data resources (e.g., PUSCH resources), which may be referred to as a single active uplink data beam. For example, this may be the case when the UE 120 is required to have a single active uplink beam for all uplink control resources and all uplink data resources (e.g., as described above in connection with reference number 310 of FIG. 3), or when the UE 120 is required to have two active uplink beams for all uplink control resources, and one of those beams is configured for and/or used for all uplink data resources (e.g., as described above in connection with reference number 315 of FIG. 3). In this case, the single active uplink data beam (e.g., shown as a PUSCH beam, but which may also be configured for and/or used for a PUCCH) may depend on an active uplink control beam (e.g., shown as a PUCCH beam), and/or may depend on one of two active downlink control beams (e.g., shown as CORESET beams) required for the UE 120 for a minimum capability corresponding to a number of active downlink beams. The active uplink control beam may be a single active uplink control beam required for the UE 120 (e.g., in the case described in connection with reference number 310 of FIG. 3), or may be one of two active uplink control beams required for the UE 120 (e.g., in the case described in connection with reference number 315 of FIG. 3). In some aspects, the single active uplink data beam may map to a single active downlink data beam (e.g., a spatial relation of the single active uplink data beam and a TCI state of the single active downlink data beam may have a same spatial relation source reference signal).

As shown in FIG. 4, in some aspects, the single active uplink data beam may depend on an active uplink control beam and/or an active downlink control beam according to a rule and/or condition. In some aspects, the rule and/or condition may indicate whether the single uplink data beam maps to an active uplink control beam or an active downlink control beam. In some aspects, the single uplink data beam may map to an active uplink control beam if a spatial relation of the active uplink control beam is available, and may map to an active downlink control beam if the spatial relation of an active uplink control beam is not available. If the single uplink data beam maps to an active uplink control beam and the UE is required to have two active uplink control beams, then the rule and/or condition may indicate which active uplink control beam maps to the single uplink data beam. However, if the UE is required to have only a single active uplink control beam, then the mapping between the single active uplink control beam and the single active uplink data beam may be implied. If the single uplink data beam maps to an active downlink control beam, then the UE 120 may indicate which active uplink downlink beam maps to the single uplink data beam.

As indicated above, in some aspects, an uplink beam (e.g., the single active uplink data beam and/or the like) may depend on a downlink beam (e.g., an active downlink control beam and/or the like) only when the UE 120 has a capability of beam correspondence between uplink beams and downlink beams. Otherwise, an uplink beam may not depend on a downlink beam when the UE 120 does not have a capability of beam correspondence between uplink beams and downlink beams.

If the single uplink data beam maps to an active uplink control beam, then the rule and/or condition may indicate that a spatial relation of the single active uplink data beam is the same as a spatial relation of the single active uplink control beam (e.g., that the spatial relations have a same spatial relation source reference signal), or that the spatial relation of the single active uplink data beam is the same as a spatial relation of whichever one of the two active uplink control beams satisfies a condition (e.g., a condition described above in connection with reference number 415). If the single uplink data beam maps to an active downlink control beam, then the rule and/or condition may indicate that a spatial relation of the single uplink data beam maps to a TCI state of whichever one of the two active downlink control beams satisfies a condition (e.g., a condition described above in connection with reference number 415).

As shown by reference number 425, the UE 120 and the base station 110 may communicate using the determined active uplink beams. For example, the base station 110 may assign, schedule, and/or receive information on uplink control resources of a determined active uplink control beam. Similarly, the base station 110 may assign, schedule, and/or receive information on uplink data resources of a determined active uplink data beam (e.g., which may be the same as an active uplink control beam). Additionally, or alternatively, the UE 120 may be assigned with, scheduled with, and/or may transmit information on uplink control resources of a determined active uplink control beam. Similarly, the UE 120 may be assigned with, scheduled with, and/or may transmit information on uplink data resources of a determined active uplink data beam. By determining the beams according to a minimum capability of the UE 120 and/or the rules and/or conditions described herein, the base station 110 and/or the UE 120 may ensure that a minimum capability of the UE 120, with respect to a number of uplink beams permitted to be concurrently active, is not violated (or at least reduce a likelihood that the minimum capability is violated), thereby reducing errors and improving performance.

As indicated above, FIG. 4 is provided as an example. Other examples may differ from what is described with respect to FIG. 4.

Figure 5:
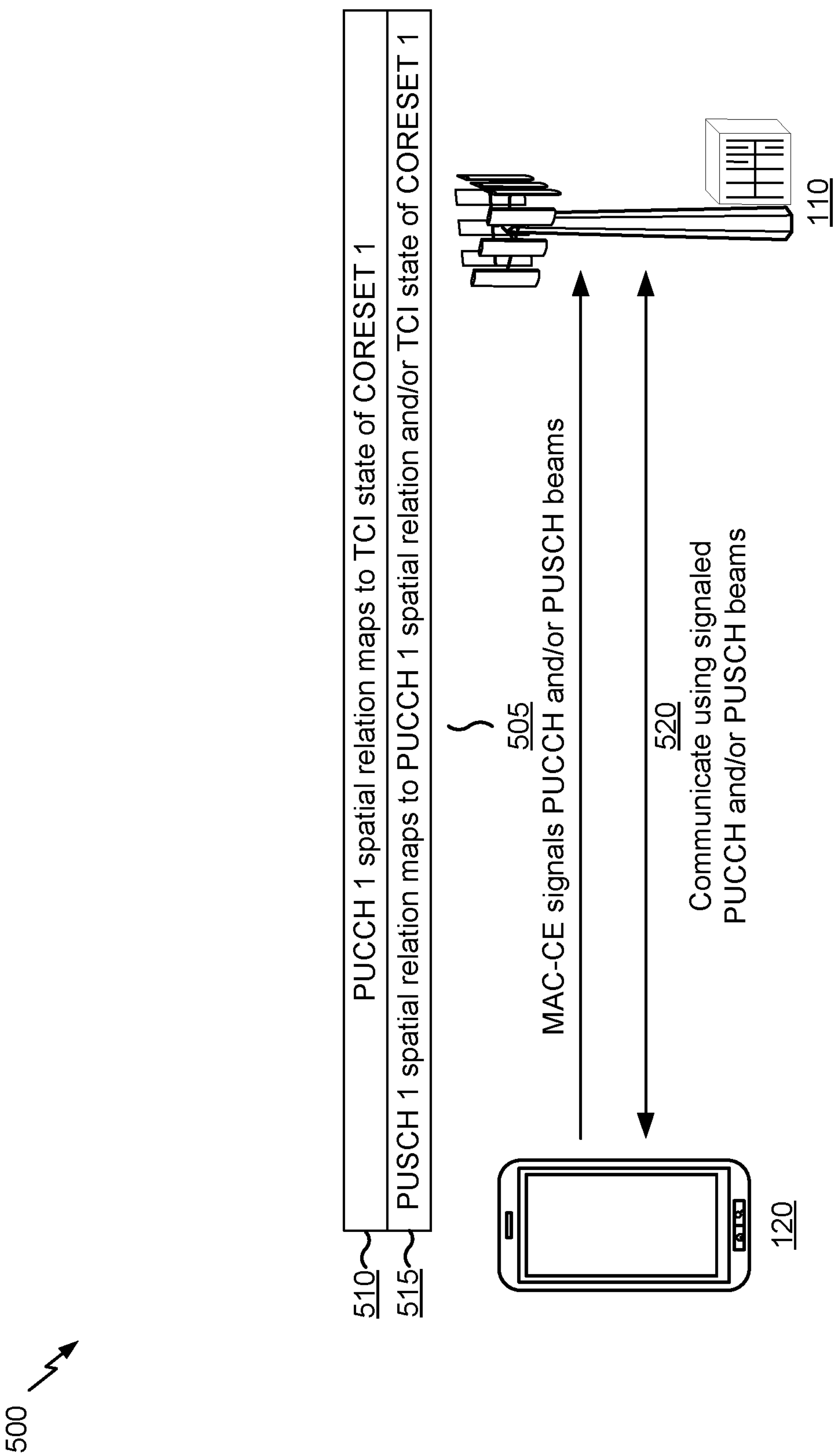

FIG. 5 is a diagram illustrating an example 500 of active beam management, configuration, and capability signaling. Example 500 relates to uplink beam determination and/or selection when a UE has a minimum capability regarding a number of active uplink beams required for the UE.

As shown by reference number 505, a base station 110 may transmit, and a UE 120 may receive, a medium access control (MAC) control element (CE) (MAC-CE) that signals one or more active uplink beams to be configured for and/or used for uplink transmissions (e.g., one or more uplink control beams and/or uplink data beams). In some aspects, the UE 120 may have a minimum capability regarding a number of active uplink beams, and may signal such capability to the base station 110, as described above in connection with FIG. 3. The base station 110 may determine the active uplink beam(s) based at least in part on the minimum capability of the UE 120. In some aspects, the base station 110 may determine the active uplink beam(s) based at least in part on a rule and/or condition, such as one or more rules and/or conditions described above in connection with FIG. 4. The base station 110 may indicate the active uplink beam(s) to the UE 120 based at least in part on the determination, such as in a MAC-CE and/or the like.

As shown by reference number 510, in some aspects, the base station 110 may indicate a mapping between an uplink control beam (e.g., an active uplink control beam, or an uplink control beam to be activated) and an active downlink control beam. For example, the base station 110 may indicate an uplink control beam (e.g., using a spatial relation identifier, an uplink control identifier, and/or the like, shown as a PUCCH identifier of "PUCCH 1") and an active downlink control beam (e.g., using a TCI state identifier, a downlink control identifier, and/or the like, shown as a CORESET identifier of "CORESET 1") to which the uplink control beam is to be mapped. As described elsewhere herein, such mapping may indicate that a spatial relation of the uplink control beam and a TCI state of the downlink control beam have the same spatial relation source reference signal.

In some aspects, the indicated uplink control beam is a single active uplink beam required for the UE 120 (e.g., as described in connection with reference number 310 of FIG. 3). In some aspects, the single active uplink beam may depend on one of two active downlink control beams required for the UE 120 (e.g., when the UE 120 supports beam correspondence between uplink beams and downlink beams). In this case, the indicated active downlink control beam may be one of the two active downlink control beams that are activated for the UE 120. Thus, the base station 110 may ensure that the minimum capability of the UE 120 is not violated. In some aspects, the single active uplink beam may not depend on one of two active downlink control beams required for the UE 120 (e.g., when the UE 120 does not support beam correspondence between uplink beams and downlink beams). In this case, the indicated active downlink control beam may or may not be one of the two active downlink control beams that are activated for the UE 120.

In some aspects, the indicated uplink control beam is at least one of two active uplink beams required for the UE 120 (e.g., as described in connection with reference number 315 of FIG. 3). In some aspects, each of the two active uplink beams may depend on a respective one of the two active downlink control beams required for the UE 120. In this case, the indicated active downlink control beam may be one of the two active downlink control beams that are activated for the UE 120. Thus, the base station 110 may ensure that the minimum capability of the UE 120 is not violated. In some aspects, the base station 110 may indicate a single mapping of a first active uplink beam, of the two active uplink beams, to a first active downlink control beam of the two active downlink control beams. In this case, the UE 120 may infer the mapping when the second active uplink beam, of the two active uplink beams, must map to the second active downlink control beam of the two active downlink control beams. Alternatively, the base station 110 may indicate both mappings.

In some aspects, the two active uplink beams may not depend on the two active downlink control beams required for the UE 120. In this case, the indicated active downlink control beam(s) may or may not be included in the two active downlink control beams that are activated for the UE 120. In some aspects, the two active uplink beams may not depend on the two active downlink beams when the UE 120 does not have a capability of beam correspondence between uplink beams and downlink beams.

As shown by reference number 515, in some aspects, the base station 110 may indicate a mapping between an uplink data beam (e.g., an active uplink data beam, or an uplink data beam to be activated) and at least one of an active uplink control beam or an active downlink control beam. For example, the base station 110 may indicate an uplink data beam (e.g., using a spatial relation identifier, an uplink data identifier, and/or the like, shown as a PUSCH identifier of "PUSCH 1") and an uplink control beam (e.g., using a spatial relation identifier, an uplink control identifier, and/or the like, shown as a PUCCH identifier of "PUCCH 1") to which the uplink data beam is to be mapped. As described elsewhere herein, such mapping may indicate that a spatial relation of the uplink data beam and a spatial relation of the uplink control beam have the same spatial relation source reference signal. Additionally, or alternatively, the base station 110 may indicate an uplink data beam and a downlink control beam (e.g., using a TCI state identifier, a downlink control identifier, and/or the like, shown as a CORESET identifier of "CORESET 1") to which the uplink data beam is mapped. As described elsewhere herein, such mapping may indicate that a spatial relation of the uplink data beam and a TCI state of the downlink control beam have the same spatial relation source reference signal.

In some aspects, the indicated uplink data beam is a single active uplink data beam required for the UE 120 (e.g., as described in connection with reference number 310 of FIG. 3 and reference number 315 of FIG. 3). In the case where the UE 120 is required to have a single active uplink control beam (e.g., as described in connection with reference number 310 of FIG. 3), the uplink data beam may map to the uplink control beam (e.g., since uplink data and uplink control both use the single active uplink beam). In the case where the UE 120 is required to have two active uplink control beams (e.g., as described in connection with reference number 315 of FIG. 3), the uplink data beam may map to one of the two active uplink control beams. In either case, the uplink control beam may depend on one of two active downlink control beams required for the UE 120. Thus, the indicated active downlink control beam, that maps to the uplink data beam, may be one of the two active downlink control beams that are activated for the UE 120. In some aspects, the single active uplink data beam may map to an active downlink control beam that corresponds to a single active downlink data beam. In this case, the single active uplink data beam may map to the single active downlink data beam. In this way, the base station 110 may ensure that the minimum capability of the UE 120 is not violated. In some aspects, the single active uplink data beam may not depend on one of two active downlink control beams required for the UE 120. In this case, the indicated active downlink control beam may or may not be one of the two active downlink control beams that are activated for the UE 120.

As shown by reference number 520, the UE 120 and the base station 110 may communicate using the signaled active uplink beams. For example, the base station 110 may assign, schedule, and/or receive information on uplink control resources of a signaled active uplink control beam. Similarly, the base station 110 may assign, schedule, and/or receive information on uplink data resources of a signaled active uplink data beam (e.g., which may be the same as an active uplink control beam). Additionally, or alternatively, the UE 120 may be assigned with, scheduled with, and/or may transmit information on uplink control resources of a signaled active uplink control beam. Similarly, the UE 120 may be assigned with, scheduled with, and/or may transmit information on uplink data resources of a signaled active uplink data beam. By signaling the beams according to a minimum capability of the UE 120 and/or the rules and/or conditions described herein, the base station 110 and/or the UE 120 may ensure that a minimum capability of the UE 120, with respect to a number of uplink beams permitted to be concurrently active, is not violated (or at least reduce a likelihood that the minimum capability is violated), thereby reducing errors and improving performance.

As indicated above, FIG. 5 is provided as an example. Other examples may differ from what is described with respect to FIG. 5.

Figure 6:
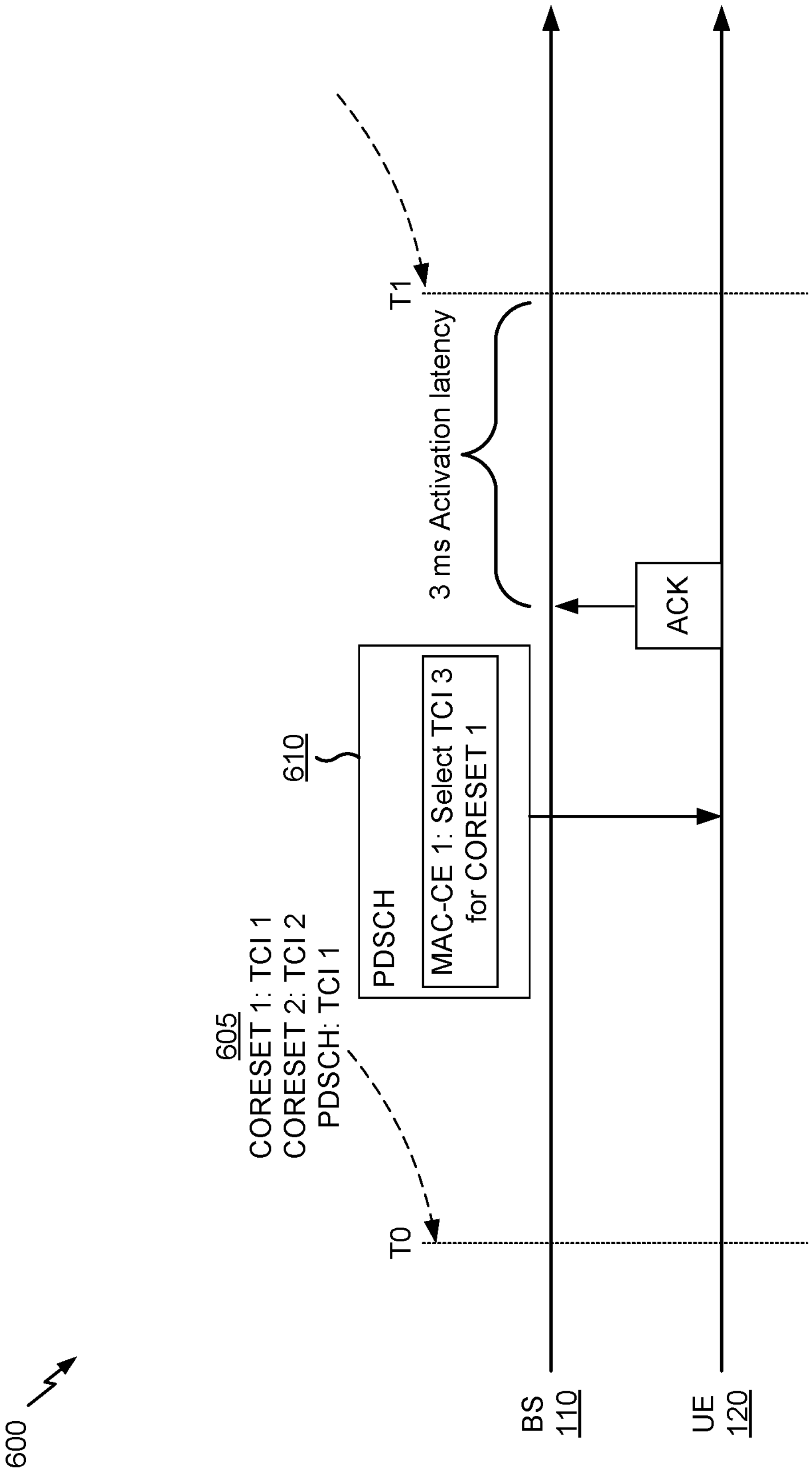

FIG. 6 is a diagram illustrating an example 600 of active beam management, configuration, and capability signaling. Example 600 relates to beam selection and/or reselection (e.g., for uplink beams and/or downlink beams) when a UE has a minimum capability regarding a number of active beams (e.g., uplink beams and/or downlink beams) required for the UE.

As shown by reference number 605, at a first time TO, a UE 120 may use a first TCI state (shown as TCI 1) for a first downlink control beam (shown as CORESET 1) and for a downlink data beam (shown as PDSCH), and may use a second TCI state (shown as TCI 2) for a second downlink control beam (shown as CORESET 2). In this case, the UE 120 may have a minimum capability corresponding to a number of active downlink beams. As described elsewhere herein, this minimum capability may be two active downlink beams, where a first active downlink beam (e.g., having TCI state 1) is configured for and/or used for both control and data, and a second active downlink beam (e.g., having TCI state 2) is configured and/or used only for control (and not data).

As shown by reference number 610, the UE 120 may receive, in a MAC-CE transmitted by a base station 110, an indication to reselect an active source beam. As used herein, a source beam may refer to a first beam from which a second beam depends, and the second beam that depends on the source beam may be referred to as a dependent beam. Thus, a dependent beam may depend on a source beam. When a dependent beam depends on a source beam, a beam identifier (e.g., a TCI state for a downlink beam or a spatial relation for an uplink beam) of the dependent beam may be updated when a beam identifier of the source beam changes. In some aspects, the beam identifier of the first beam may be updated to match the beam identifier of the second beam. In some aspects, a beam dependency may be predefined according to a rule in a wireless communication standard. As described elsewhere herein, the source beam may be a downlink control beam (e.g., a CORESET beam, a PDCCH beam, and/or the like), and the dependent beam may be a downlink data beam (e.g., a PDSCH beam), an uplink control beam (e.g., a PUCCH beam), and/or an uplink data beam (e.g., a PUSCH beam). As another example, the source beam may be a downlink data beam, and the dependent beam may be an uplink control beam and/or an uplink data beam. As another example, the source beam may be an uplink control beam, and the dependent beam may be an uplink data beam.

In example 600, the first downlink control beam may be a source beam, and the downlink data beam may be a dependent beam that depends on the first downlink control beam. As shown in FIG. 6, the MAC-CE may indicate that the UE 120 is to reselect the first downlink control beam to a third downlink beam having a third TCI state (shown as TCI 3). In this case, downlink control resources (e.g., CORESET 1) previously associated with the first downlink beam (having TCI state 1) will be associated with the third downlink beam (having TCI state 3).

However, this would violate a minimum capability of the UE 120 because the UE 120 would have three active downlink beams: a first beam with TCI 1 for the PDSCH, a second beam with TCI 2 for CORESET 2, and a third beam with TCI 3 for CORESET 1. In this case, the UE 120 does not have an active downlink beam configured for both control and data. Thus, the minimum capability requirement would be violated. To prevent such a violation, the UE 120 may (e.g., autonomously) reselect an active dependent beam that depends on the source beam. In some aspects, the UE 120 may perform such reselection based at least in part on receiving the indication to reselect the active source beam. Additionally, or alternatively, the UE 120 may perform such reselection based at least in part on a determination that the UE 120 has a minimum capability corresponding to a number of active beams, and/or based at least in part on a determination that the minimum capability would be violated due to re selection of the source beam. Thus, in some aspects, reselection of a dependent beam may be implied by the indication to reselect a source beam from which the dependent beam depends, without explicit signaling to reselect the dependent beam. In this case, a single MAC-CE may be used to signal reselection of both the source beam and the dependent beam, as shown.

For example, as shown by reference number 615, the UE 120 may reselect the PDSCH beam to use the second beam having TCI state 2, which is the same active beam configured for and/or used for CORESET 2. The UE 120 may also reselect the active source beam. In this way, the UE 120 only has two active downlink beams: a first beam having TCI state 2 and configured for and/or used for CORESET 2 and the PDSCH, and a second beam having TCI state 3 and configured for and/or used for CORESET 1. Thus, the minimum capability of the UE 120 is not violated because the reselection causes the UE 120 to have two active downlink beams, with a first active downlink beam (e.g., having TCI state 2) configured for both control and data, and a second active downlink beam (e.g., having TCI state 3) configured for only control (and not data). In some aspects, the UE 120 may transmit an acknowledgement (ACK), corresponding to the MAC-CE, to the base station 110, shown as ACK in FIG. 6. In some aspects, there may be a delay between when the UE 120 transmits the ACK and when the UE 120 completes a procedure to reselect a beam, shown as a 3 millisecond (ms) activation latency as an example.

In some aspects, the UE 120 may reselect the dependent beam to depend from another active source beam that satisfies a condition, as described elsewhere herein. In example 600, the condition may be an active source beam having the lowest TCI state identifier. In this case, the dependent beam is reselected to the beam have TCI state 2, rather than the beam having TCI state 3. In some aspects, other conditions may be used. In some aspects, the UE 120 may reselect the dependent beam to depend from a source beam to be reselected. In this case, since the indication in the MAC-CE caused a reselection to a beam having TCI state 3, the PDSCH beam would be reselected to have TCI state 3.

In some aspects, the UE 120 and the base station 110 may communicate using the reselected source beam and/or the reselected dependent beam (e.g., after the UE 120 acknowledges the MAC-CE, and after a subsequent time period for activating the beam(s) expires, as shown). For example, the base station 110 and/or the UE 120 may assign, schedule, transmit, and/or receive information on the reselected source beam and/or the reselected dependent beam, as described elsewhere herein. By selecting and/or reselecting beams in this manner, the base station 110 and/or the UE 120 may ensure that a minimum capability of the UE 120, with respect to a number of uplink beams and/or downlink beams permitted to be concurrently active, is not violated (or at least reduce a likelihood that the minimum capability is violated), thereby reducing errors and improving performance.

As indicated above, FIG. 6 is provided as an example. Other examples may differ from what is described with respect to FIG. 6.

Figure 7:
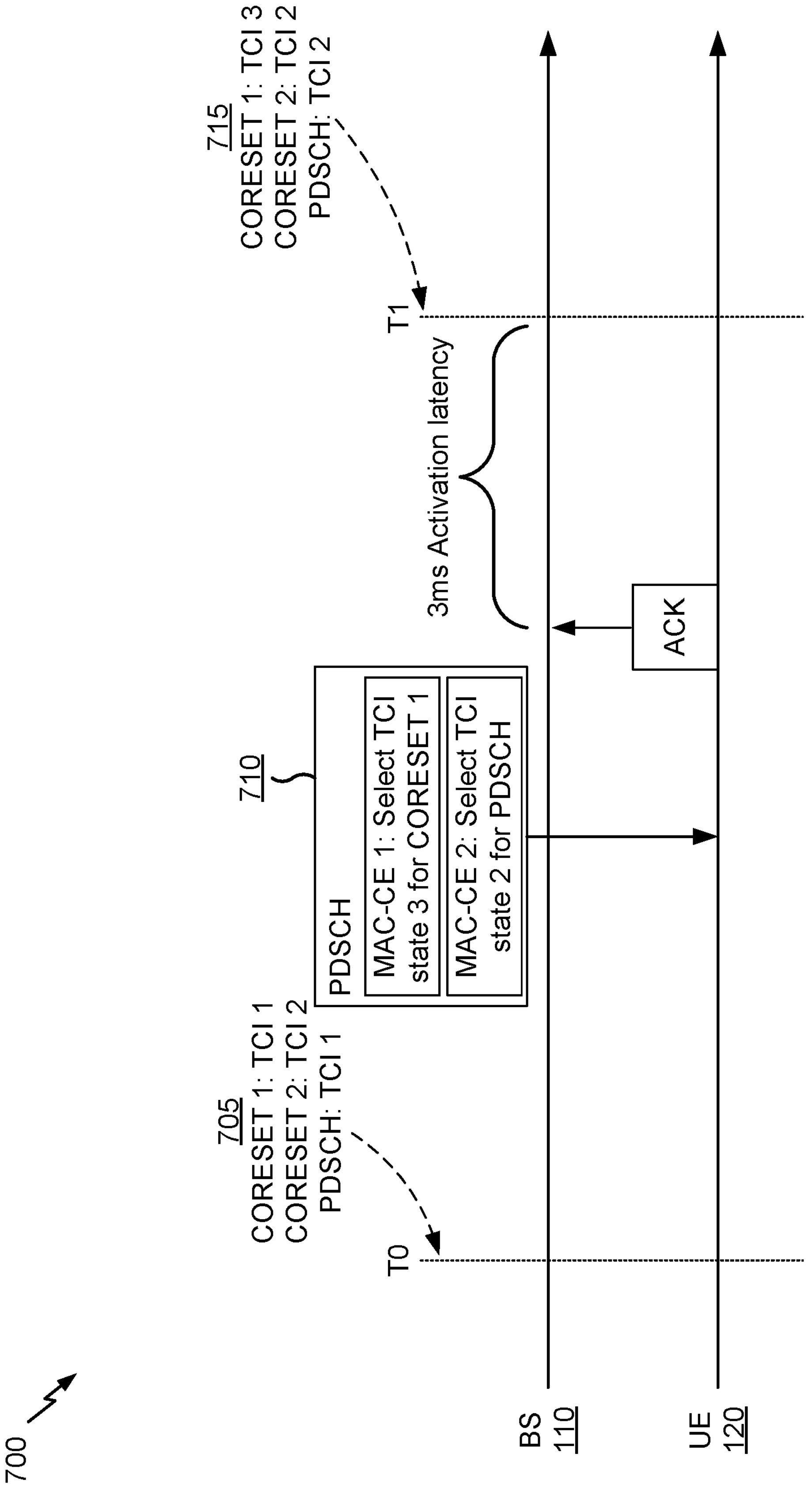

FIG. 7 is a diagram illustrating an example 700 of active beam management, configuration, and capability signaling. Example 700 relates to beam selection and/or reselection (e.g., for uplink beams and/or downlink beams) when a UE has a minimum capability regarding a number of active beams (e.g., uplink beams and/or downlink beams) required for the UE.

As shown by reference number 705, at a first time TO, a UE 120 may use a first TCI state (shown as TCI 1) for a first downlink control beam (shown as CORESET 1) and for a downlink data beam (shown as PDSCH), and may use a second TCI state (shown as TCI 2) for a second downlink control beam (shown as CORESET 2), as described above in connection with FIG. 6. As further described above in connection with FIG. 6, the UE 120 may have a minimum capability corresponding to a number of active downlink beams.

As shown by reference number 710, the UE 120 may receive, in multiple MAC-CEs transmitted by a base station 110, an indication to reselect an active source beam and an indication to reselect an active dependent beam. In example 700, the first downlink control beam is a source beam, and the downlink data beam is a dependent beam that depends on the first downlink control beam. As shown in FIG. 7, a first MAC-CE may indicate that the UE 120 is to reselect the first downlink control beam to a third downlink beam having a third TCI state (shown as TCI 3), and a second MAC-CE may indicate that the UE 120 is to reselect the downlink data beam to the second beam having the second TCI state (shown as TCI state 2). In some aspects, the base station 110 may determine that reselection of the source beam would violate a minimum capability of the UE 120, as described above in connection with FIG. 6. Thus, the base station 110 may indicate that both the source beam and the dependent beam are to be reselected, thereby avoiding a violation of the minimum capability. Thus, in some aspects, reselection of a dependent beam may be explicitly indicated (e.g., in a MAC-CE).

As shown in FIG. 7, in some aspects, the first MAC-CE and the second MAC-CE may be included in a same downlink data communication (e.g., a same PDSCH communication). This downlink data communication may correspond to a single acknowledgement (ACK) or negative acknowledgement (NACK). Thus, in this case, the first MAC-CE and the second MAC-CE may be acknowledged or negatively acknowledged together.

As shown by reference number 715, the UE 120 may reselect an active dependent beam, that depends on the active source beam, based at least in part on the indication. In some aspects, the active dependent beam is reselected based at least in part on an explicit indication to reselect the active dependent beam, as described above. For example, the UE 120 may reselect the PDSCH beam to use the second beam having TCI state 2 (e.g., according to the indication), which is the same active beam configured for and/or used for CORESET 2. The UE 120 may also reselect the active source beam. In this way, the UE 120 only has two active downlink beams: a first beam having TCI state 2 and configured for and/or used for CORESET 2 and the PDSCH, and a second beam having TCI state 3 and configured for and/or used for CORESET 1. Thus, the minimum capability of the UE 120 is not violated.

In some aspects, the UE 120 and the base station 110 may communicate using the reselected source beam and/or the reselected dependent beam (e.g., after the UE 120 acknowledges the MAC-CE, and after a subsequent time period for activating the beam(s) expires, as shown), as described elsewhere herein.

As indicated above, FIG. 7 is provided as an example. Other examples may differ from what is described with respect to FIG. 7.

Figure 8:
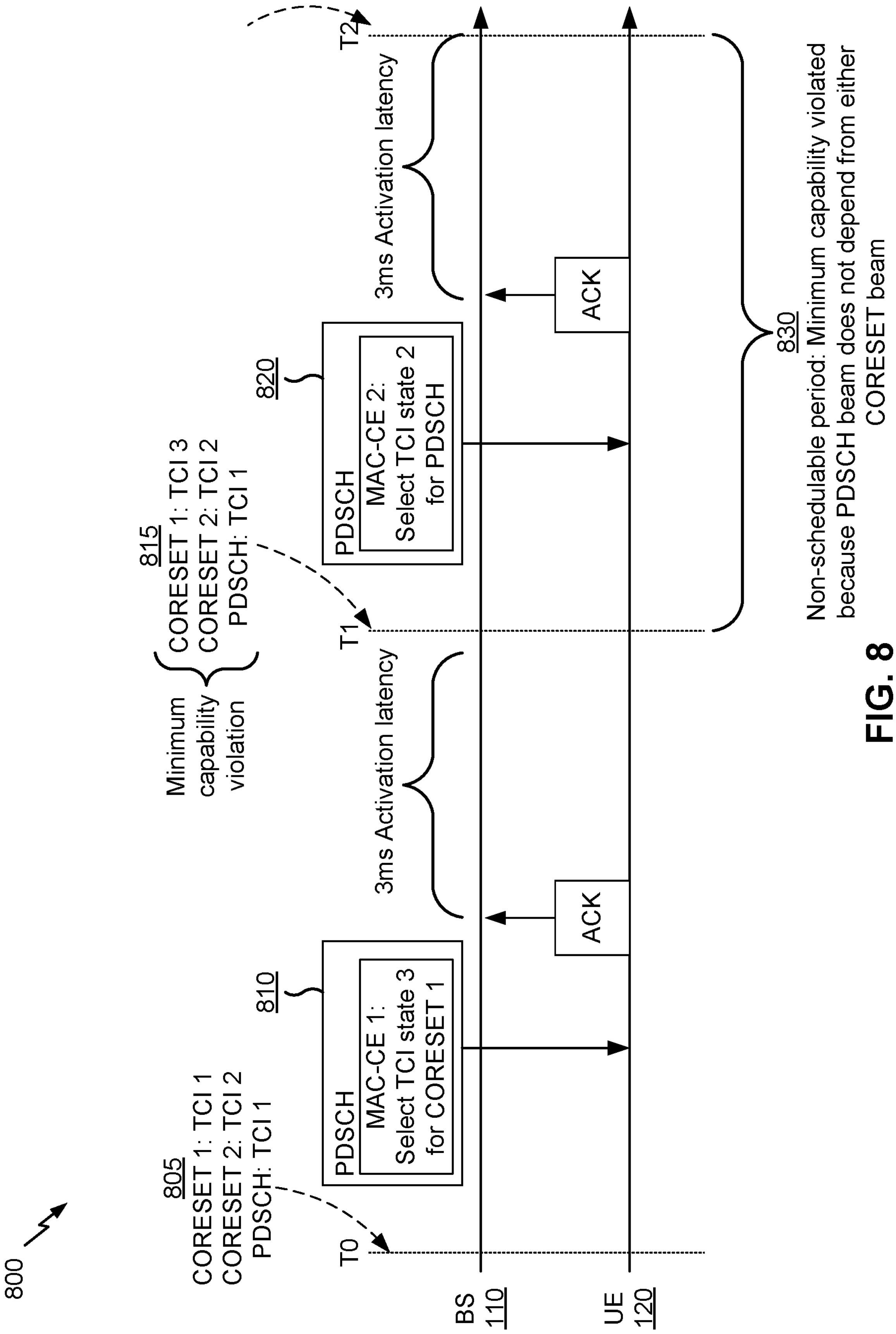

FIG. 8 is a diagram illustrating an example 800 of active beam management, configuration, and capability signaling. Example 800 relates to beam selection and/or reselection (e.g., for uplink beams and/or downlink beams) when a UE has a minimum capability regarding a number of active beams (e.g., uplink beams and/or downlink beams) required for the UE.

As shown by reference number 805, at a first time TO, a UE 120 may use a first TCI state (shown as TCI 1) for a first downlink control beam (shown as CORESET 1) and for a downlink data beam (shown as PDSCH), and may use a second TCI state (shown as TCI 2) for a second downlink control beam (shown as CORESET 2), as described above in connection with FIGS. 6-7. As further described above in connection with FIGS. 6-7, the UE 120 may have a minimum capability corresponding to a number of active downlink beams.

As shown by reference number 810, the UE 120 may receive, in a first MAC-CE transmitted by a base station 110, an indication to reselect an active source beam. In example 800, the first downlink control beam is a source beam, and the downlink data beam is a dependent beam that depends on the first downlink control beam. As shown in FIG. 8, the first MAC-CE may indicate that the UE 120 is to reselect the first downlink control beam to a third downlink beam having a third TCI state (shown as TCI 3).

As shown by reference number 815, reselecting the active source beam (e.g., the first downlink control beam) would violate a minimum capability of the UE 120 because the UE 120 would have three active downlink beams: a first beam with TCI 1 for the PDSCH, a second beam with TCI 2 for CORESET 2, and a third beam with TCI 3 for CORESET 1. In some aspects, the base station 110 may detect this violation.

As shown by reference number 820, to prevent such a violation, the base station 110 may transmit a second MAC-CE that indicates that the UE 120 is to reselect the downlink data beam (e.g., the dependent beam) to the second beam having the second TCI state (shown as TCI state 2). In this way, the base station 110 may indicate that both the source beam and the dependent beam are to be reselected, thereby avoiding a violation of the minimum capability.

As shown in FIG. 8, in some aspects, the first MAC-CE and the second MAC-CE may be included in different downlink data communications (e.g., different PDSCH communications). These different downlink data communications may correspond to different acknowledgements (ACKs) or negative acknowledgements (NACKs). Thus, in this case, the first MAC-CE and the second MAC-CE may be acknowledged or negatively acknowledged separately.

As shown by reference number 825, the UE 120 may reselect an active dependent beam, that depends on the active source beam, based at least in part on the indication. In some aspects, the active dependent beam is reselected based at least in part on an explicit indication to reselect the active dependent beam, as described above. For example, the UE 120 may reselect the PDSCH beam to use the second beam having TCI state 2 (e.g., according to the indication), which is the same active beam configured for and/or used for CORESET 2. The UE 120 may also reselect the active source beam. In this way, the UE 120 only has two active downlink beams: a first beam having TCI state 2 and configured for and/or used for CORESET 2 and the PDSCH, and a second beam having TCI state 3 and configured for and/or used for CORESET 1. Thus, the minimum capability of the UE 120 is not violated.

As shown by reference number 830, transmission of the first MAC-CE and the second MAC-CE in different downlink communications may result in a time period where the minimum capability is violated. During this time period, the active source beam has been reselected (e.g., at time T1), but the active dependent beam has not yet been reselected (e.g., which occurs at time T2). To avoid a minimum capability violation, the base station 110 may refrain from scheduling communications for the UE 120 (e.g., at least on the dependent beam) during this time period. Additionally, or alternatively, the UE 120 may refrain from transmitting communications (e.g., at least on the dependent beam) during this time period. Once the dependent beam has been reselected, the base station 110 may schedule communications on the dependent beam, and the UE 120 may transmit communications on the dependent beam. In this way, violation of the minimum capability may be avoided.

As indicated above, FIG. 8 is provided as an example. Other examples may differ from what is described with respect to FIG. 8.

Although FIGS. 6-8 show examples of a downlink control beam as a source beam and a downlink data beam as a dependent beam, other examples of source beams and/or dependent beams are contemplated, as indicated above. Furthermore, although FIGS. 6-8 show examples of reselecting downlink beams in connection with a minimum capability corresponding to a number of active downlink beams, in some aspects, such reselection may be performed for uplink beams in connection with a minimum capability corresponding to a number of active downlink beams, in a similar manner to that described herein.

Figure 9:
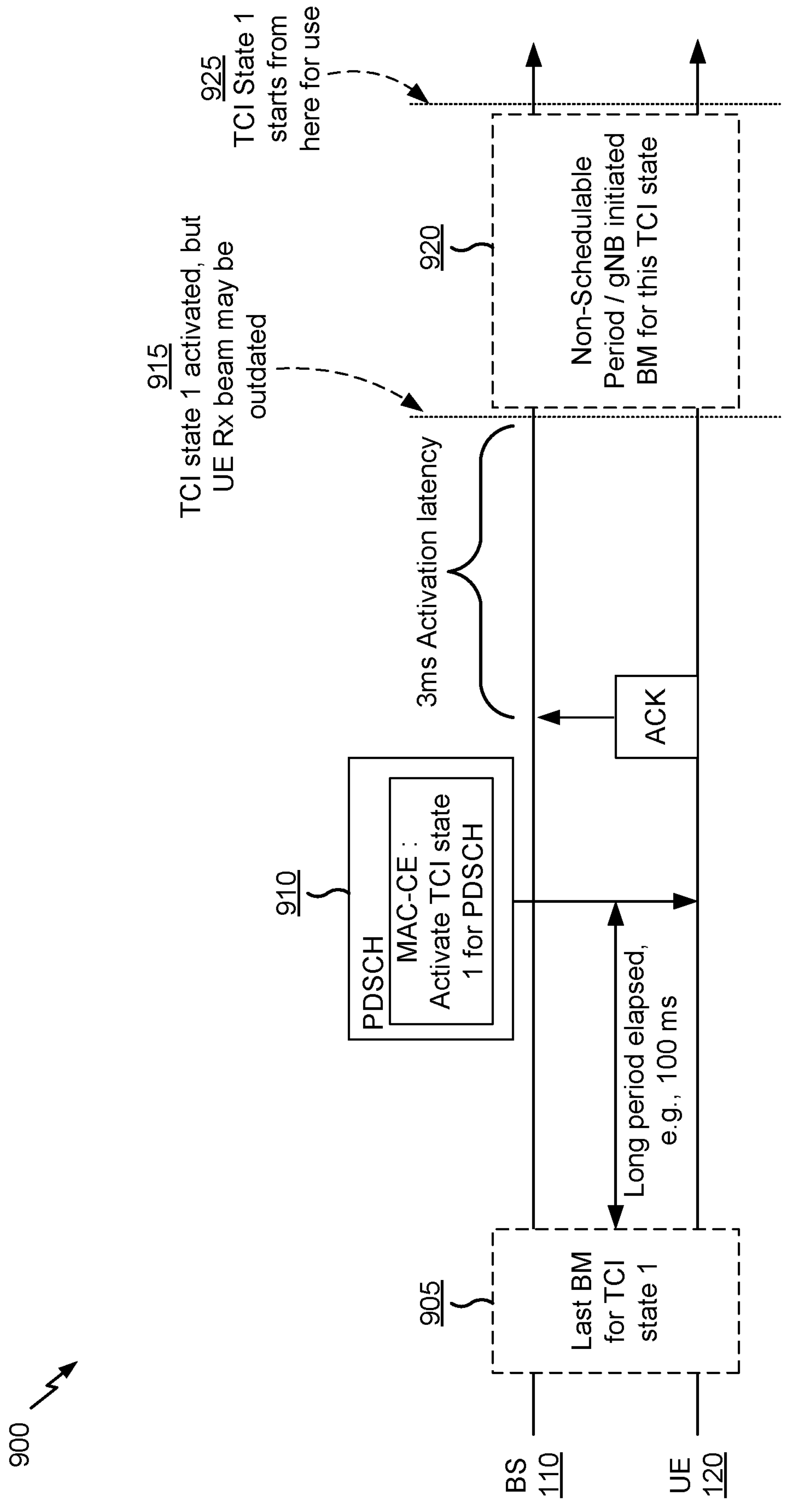

FIG. 9 is a diagram illustrating an example 900 of active beam management, configuration, and capability signaling. Example 900 relates to beam management when a beam configuration is outdated for a UE.

As shown by reference number 905, a UE 120 may perform a beam management (BM) procedure associated with a beam (e.g., associated with a particular TCI state or spatial relation) at a first time. The beam management procedure may include, for example, receiving signals to select and/or refine a beam, such as signals of a synchronization signal burst set, channel state information reference signals (CSI-RS), and/or the like. As shown, the beam management procedure may be performed in association with a downlink beam having a first TCI state (shown as TCI state 1).

As shown by reference number 910, at a later time, a base station 110 may transmit, and the UE 120 may receive, an indication to activate a beam. For example, the indication may indicate that the downlink beam having the first TCI state is to be activated. As shown, the indication may be included in a MAC-CE.

As shown by reference number 915, the UE 120 may determine that a beam management configuration, associated with the beam to be activated, is outdated. For example, the beam management configuration may be outdated when a threshold amount of time (e.g., shown as 100 ms) elapses between the most recent beam management procedure performed for the beam and reception of the indication to activate the beam, as shown in FIG. 9. Additionally, or alternatively, the beam management configuration may be outdated when a threshold amount of time has elapsed since a most recent reference signal received power (RSRP) parameter was reported for the beam, when a threshold amount of time has elapsed since an aperiodic CSI-RS resource set was transmitted for the beam, and/or the like. Additionally, or alternatively, the UE 120 may determine that the beam management configuration is outdated based at least in part on an instruction, from the base station 110, to perform the beam management procedure for the beam.

As shown by reference number 920, the UE 120 may perform a beam management procedure for the beam based at least in part on receiving the indication to activate the beam and determining that the beam management configuration is outdated for the beam. As shown, in some aspects, the beam management procedure may be performed during a time period (e.g., a non-schedulable period) that follows the indication to activate the beam. During this time period, the base station 110 may refrain from scheduling communications for the UE 120 (e.g., at least on the beam to be activated). Additionally, or alternatively, the UE 120 may refrain from transmitting communications (e.g., at least on the beam to be activated) during this time period. In this way, the UE 120 and the base station 110 may avoid communicating on a beam that has poor conditions.

In some aspects, the UE 120 may perform the beam management procedure by refining at least one receive beam of the UE 120. The at least one receive beam may be refined using, for example, at least one synchronization signal burst set, at least one set of CSI-RS (e.g., for a beam sweeping procedure), and/or the like. In this case, the time period may be longer than a period of a synchronization signal burst set (e.g., when the synchronization signal burst set is to be used for the beam management procedure), may be longer than a period of periodic CSI-RS resources (e.g., when the CSI-RS resources are to be used for the beam management procedure), and/or the like.

As shown by reference number 925, the base station 110 and the UE 120 may communicate using the beam after the time period (e.g., after the beam management procedure has been performed). In some aspects, if the beam is associated with a poor condition, then the UE 120 and/or the base station 110 may refine the beam, may select a different beam, and/or the like. In this way, the base station 110 and the UE 120 may avoid communicating on a beam that has poor conditions.

Although FIG. 9 shows an example of performing a beam management procedure in association with a downlink beam, in some aspects, such a beam management procedure may be performed in association with an uplink beam, in a similar manner to that described herein.

As indicated above, FIG. 9 is provided as an example. Other examples may differ from what is described with respect to FIG. 9.

Figure 10:
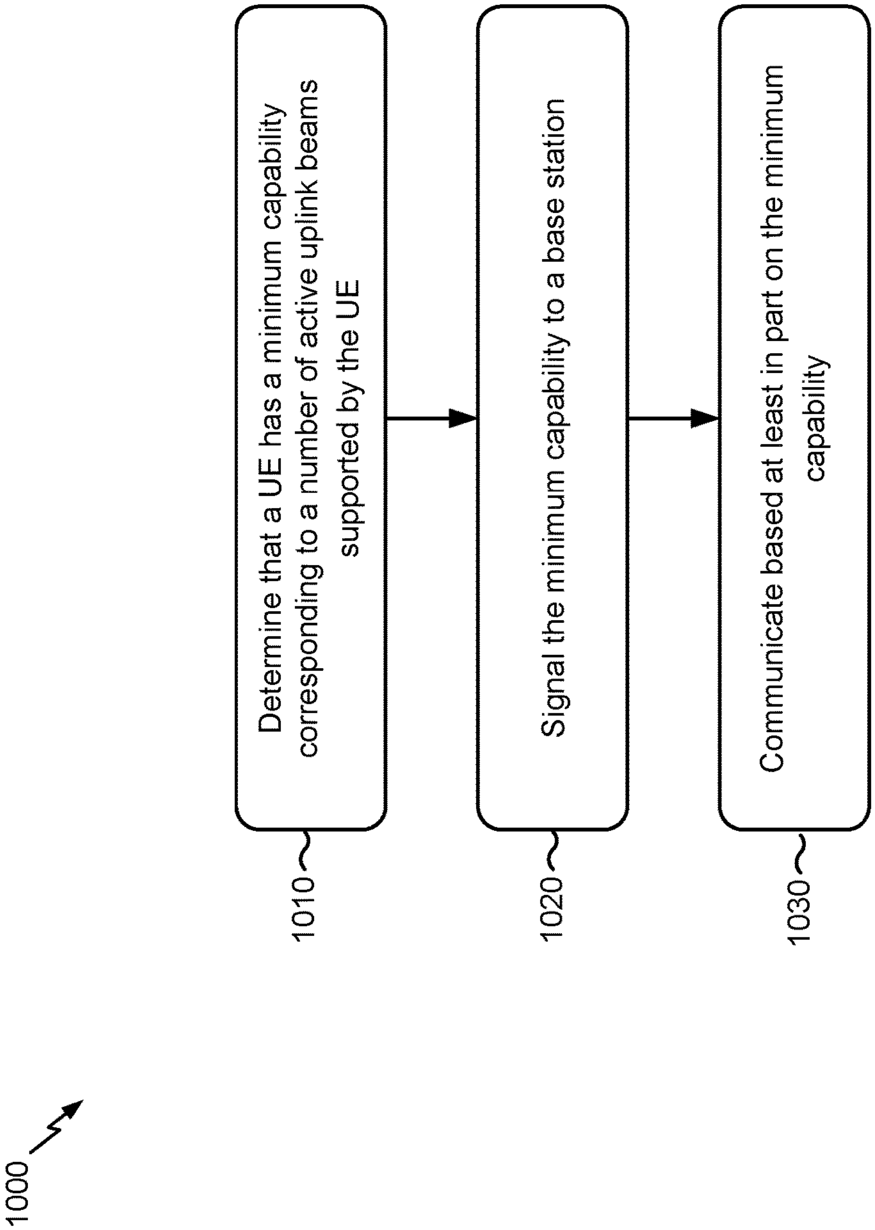
FIGS. 10-14 are flow charts of example methods of wireless communication.

FIG. 10 is a flow chart of a method 1000 of wireless communication. The method may be performed by a UE (e.g., the UE 120, the apparatus 1502/1502', and/or the like).

At 1010, the UE may determine that the UE has a minimum capability corresponding to a number of active uplink beams supported by the UE. For example, the UE (e.g., using controller/processor 280 and/or the like) may determine that the UE has a minimum capability corresponding to a number of active uplink beams supported by the UE, as described above in connection with FIGS. 3-5.

At 1020, the UE may signal the minimum capability to a base station. For example, the UE (e.g., using controller/processor 280, transmit processor 264, TX MIMO processor 266, MOD 254, antenna 252, and/or the like) may signal the minimum capability to a base station, as described above in connection with FIGS. 3-5.

At 1030, the UE may communicate based at least in part on the capability. For example, the UE (e.g., using controller/processor 280, transmit processor 264, TX MIMO processor 266, MOD 254, antenna 252, DEMOD 254, MIMO detector 256, receive processor 258, and/or the like) may communicate with the base station based at least in part on the capability, as described above in connection with FIGS. 3-5.

Method 1000 may include additional aspects, such as any single aspect or any combination of aspects described below and/or in connection with one or more other processes described elsewhere herein.

In some aspects, the minimum capability is implicitly signaled by signaling a minimum capability corresponding to a number of active downlink beams supported by the UE. In some aspects, the minimum capability is signaled separately from a minimum capability corresponding to a number of active downlink beams supported by the UE.

In some aspects, the minimum capability is a capability to support a single active uplink beam for all uplink control resources and all uplink data resources. In some aspects, a common spatial relation is used for transmission across all uplink control resources and all uplink data resources. In some aspects, the single active uplink beam is configured for uplink control, and the single active uplink beam depends on one of two active downlink control beams supported by the UE for a minimum capability corresponding to a number of active downlink beams. In some aspects, the single active uplink beam depends on the one of the two active downlink control beams according to a condition. In some aspects, a spatial relation of the single active uplink beam maps to a transmission configuration indicator (TCI) state of the one of the two active downlink control beams that satisfies the condition. In some aspects, the condition is that the one of the two active downlink control beams is associated with a lower downlink control identifier in a current bandwidth part than the other of the two active downlink control beams. In some aspects, the single active uplink beam is indicated to the UE in a medium access control (MAC) control element (CE). In some aspects, the MAC-CE indicates a spatial relation, of the single active uplink beam, that maps to a TCI state of the one of the two active downlink control beams.

In some aspects, the single active uplink beam is configured for uplink control, and the single active uplink beam does not depend on one of two active downlink control beams supported by the UE for a minimum capability corresponding to a number of active downlink beams. In some aspects, the single active uplink beam is indicated to the UE in a MAC-CE.

In some aspects, the minimum capability is a capability to support two active uplink beams for all uplink control resources and a single active uplink beam for all uplink data resources, wherein the single active uplink beam for all uplink data resources is one of the two active uplink beams for all uplink control resources. In some aspects, two spatial relations are used for transmission across different uplink control resources, and one of the two spatial relations is used for transmission across different uplink data resources.

In some aspects, the two active uplink beams are configured for uplink control, and each of the two active uplink beams depends on a respective one of two active downlink control beams supported by the UE for a minimum capability corresponding to a number of active downlink beams. In some aspects, each of the two active uplink beams depends on a respective one of the two active downlink control beams when the UE has a capability to support beam correspondence between uplink beams and downlink beams. In some aspects, each of the two active uplink beams depends on the respective one of the two active downlink control beams according to a condition. In some aspects, a spatial relation of a first active uplink beam, of the two active uplink beams, maps to a TCI state of a first active downlink control beam of the two active downlink control beams. In some aspects, the first active uplink beam is associated with a lower spatial relation identifier between the two active uplink beams, and the first active downlink control beam is associated with a lower downlink control identifier, in a current bandwidth part, between the two active downlink control beams.

In some aspects, the two active uplink beams are indicated to the UE in a MAC-CE. In some aspects, the MAC-CE indicates at least a first spatial relation, of a first active uplink beam of the two active uplink beams, that maps to a TCI state of a first active downlink control beam of the two active downlink control beams.

In some aspects, the two active uplink beams are configured for uplink control, and the two active uplink beams do not depend on two active downlink control beams supported by the UE for a minimum capability corresponding to a number of active downlink beams. In some aspects, the two active uplink beams do not depend on the two active downlink control beams when the UE does not have a capability to support beam correspondence between uplink beams and downlink beams. In some aspects, the two active uplink beams are indicated to the UE in a MAC-CE.

In some aspects, the minimum capability is a capability to support a single active uplink data beam. In some aspects, the single active uplink data beam depends on an active uplink control beam or one of two active downlink control beams supported by the UE for a minimum capability corresponding to a number of active downlink beams. In some aspects, the single active uplink data beam depends on one of the two active downlink control beams when the UE has a capability to support beam correspondence between uplink beams and downlink beams. In some aspects, the active uplink control beam is a single active uplink control beam supported by the UE for the minimum capability. In some aspects, the active uplink control beam is one of two active uplink control beams supported by the UE for the minimum capability.

In some aspects, the single active uplink data beam depends on the active uplink control beam or the one of the two active downlink control beams according to one or more conditions. In some aspects, a spatial relation of the single active uplink data beam maps to a spatial relation of the active uplink control beam that satisfies a first condition, of the one or more conditions, or maps to a TCI state of the one of the two active downlink control beams that satisfies a second condition of the one or more conditions. In some aspects, the first condition is that the spatial relation of the active uplink control beam has a lowest spatial relation identifier among all active uplink control beams. In some aspects, the second condition is that the one of the two active downlink control beams is associated with a lower downlink control identifier in a current bandwidth part than the other of the two active downlink control beams.

In some aspects, the single active uplink data beam depends on the active uplink control beam if a spatial relation of the active uplink control beam is available, or the single active uplink data beam depends on the one of the two active downlink control beams if the spatial relation of the active uplink control beam is not available. In some aspects, the single active uplink data beam is indicated to the UE in a MAC-CE. In some aspects, the MAC-CE indicates a spatial relation, for the single active uplink data beam, that maps to a spatial relation of the active uplink control beam or that maps to a TCI state of one of the two active downlink control beams. In some aspects, the TCI state of the one of the two active downlink control beams corresponds to an active downlink data beam. In some aspects, the MAC-CE indicates a spatial relation, for the single active uplink data beam, that maps to a TCI state of a single active downlink data beam.

In some aspects, the single active uplink data beam does not depend on an active uplink control beam or one of two active downlink control beams supported by the UE for a minimum capability corresponding to a number of active downlink beams. In some aspects, the single active uplink data beam is indicated to the UE in a MAC-CE.

In some aspects, the minimum capability is a capability to support two or more active uplink beams for all uplink control resources and all uplink data resources. In some aspects, two or more spatial relations are used for transmission across different uplink control resources and uplink data resources. In some aspects, the number of active uplink beams includes an uplink beam determined based at least in part on a random access procedure in addition to one or more active uplink beams determined in a connected mode.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
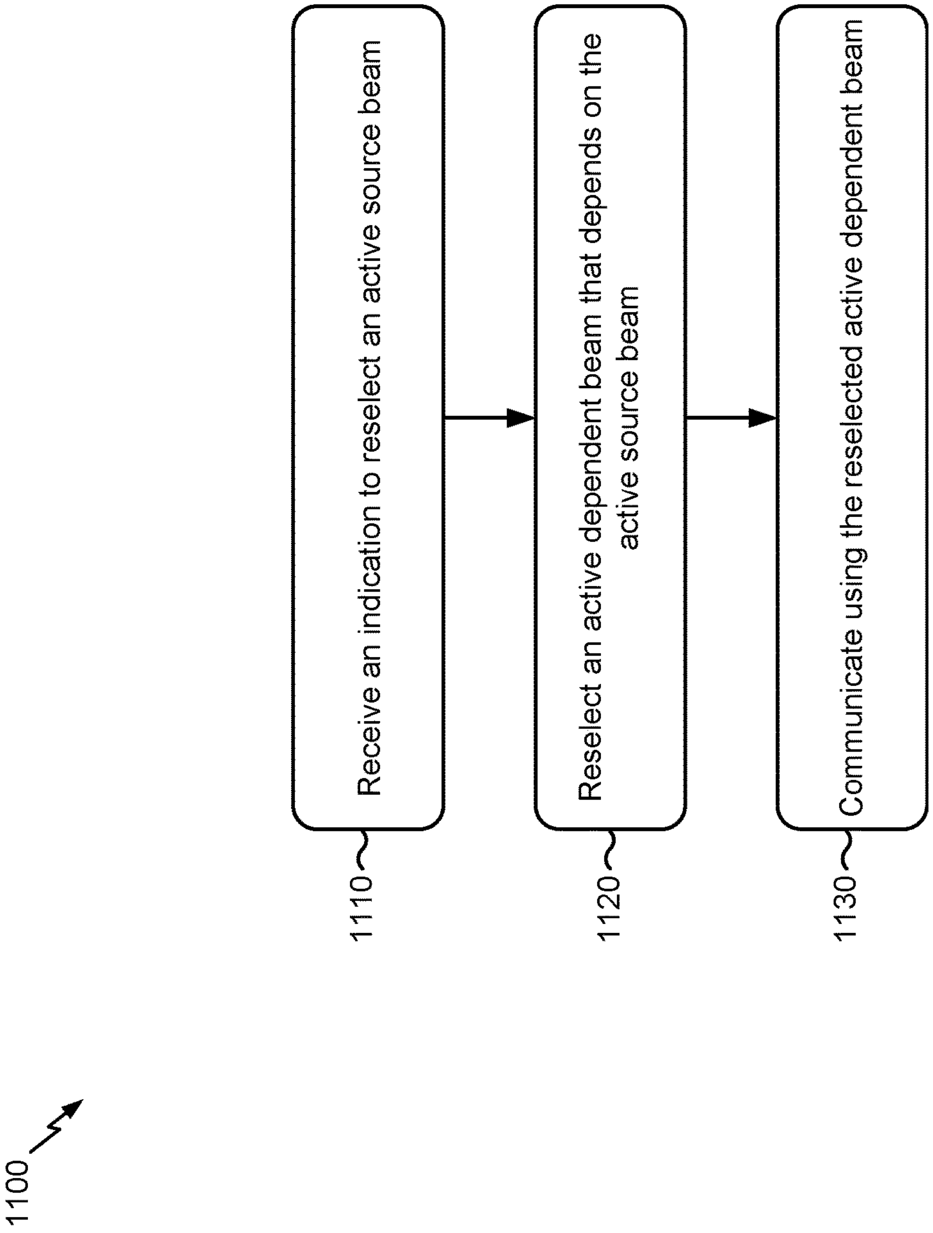

FIG. 11 is a flow chart of a method 1100 of wireless communication. The method may be performed by a UE (e.g., the UE 120, the apparatus 1502/1502', and/or the like).

At 1110, the UE may receive an indication to reselect an active source beam. For example, the UE (e.g., using antenna 252, DEMOD 254, MIMO detector 256, receive processor 258, controller/processor 280, and/or the like) may receive an indication to reselect an active source beam, as described above in connection with FIGS. 6-8.

At 1120, the UE may reselect an active dependent beam, that depends on the active source beam, based at least in part on the indication. For example, the UE (e.g., using controller/processor 280 and/or the like) may reselect an active dependent beam, that depends on the active source beam, based at least in part on the indication, as described above in connection with FIGS. 6-8.

At 1130, the UE may communicate using the reselected active dependent beam based at least in part on reselecting the active dependent beam. For example, the UE (e.g., using controller/processor 280, transmit processor 264, TX MIMO processor 266, MOD 254, antenna 252, DEMOD 254, MIMO detector 256, receive processor 258, and/or the like) may communicate using the reselected active dependent beam based at least in part on reselecting the active dependent beam, as described above in connection with FIGS. 6-8.

Method 1100 may include additional aspects, such as any single aspect or any combination of aspects described below and/or in connection with one or more other processes described elsewhere herein.

In some aspects, the active source beam is an active downlink control beam and the active dependent beam is an active downlink data beam, the active source beam is an active downlink control beam and the active dependent beam is an active uplink control beam, the active source beam is an active downlink data beam and the active dependent beam is an active uplink control beam, the active source beam is an active downlink data beam and the active dependent beam is an active uplink data beam, the active source beam is an active downlink control beam and the active dependent beam is an active uplink data beam, or the active source beam is an active uplink control beam and the active dependent beam is an active uplink data beam.

In some aspects, the indication is received in a medium access control (MAC) control element (CE) received from a base station. In some aspects, reselection of the active dependent beam is implied by the indication to reselect the active source beam. In some aspects, a single MAC-CE is used to signal reselection of both the active source beam and the active dependent beam.

In some aspects, the active dependent beam is reselected based at least in part on an explicit indication to reselect the active dependent beam. In some aspects, a first MAC-CE is used to signal reselection of the active source beam, and a second MAC-CE is used to signal reselection of the active dependent beam.

In some aspects, the first MAC-CE and the second MAC-CE are included in a same downlink data communication. In some aspects, the first MAC-CE and the second MAC-CE are acknowledged or negatively acknowledged together. In some aspects, the first MAC-CE and the second MAC-CE are included in different downlink data communications. In some aspects, communications of the UE are not scheduled on the active dependent beam, prior to reselecting the active dependent beam, for a time period where the active source beam has been reselected and the active dependent beam has not yet been reselected. In some aspects, the first MAC-CE and the second MAC-CE are acknowledged or negatively acknowledged separately.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
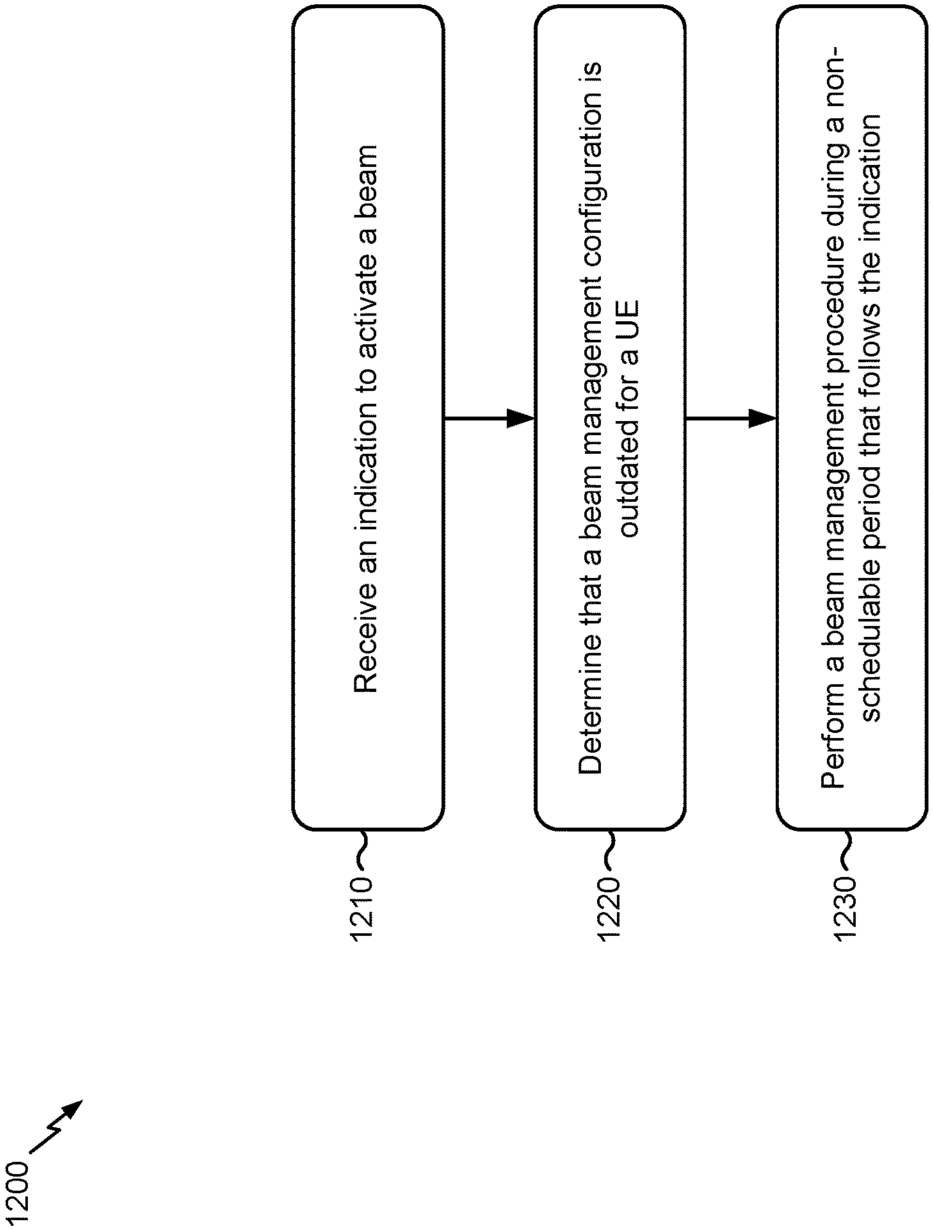

FIG. 12 is a flow chart of a method 1200 of wireless communication. The method may be performed by a UE (e.g., the UE 120, the apparatus 1502/1502', and/or the like).

At 1210, the UE may receive an indication to activate a beam. For example, the UE (e.g., using antenna 252, DEMOD 254, MIMO detector 256, receive processor 258, controller/processor 280, and/or the like) may receive an indication to activate a beam, as described above in connection with FIG. 9.

At 1220, the UE may determine that a beam management configuration is outdated for the UE. For example, the UE (e.g., using controller/processor 280 and/or the like) may determine that a beam management configuration is outdated for the UE, as described above in connection with FIG. 9.

At 1230, the UE may perform a beam management procedure, during a time period that follows the indication, based at least in part on receiving the indication and determining that the beam management configuration is outdated. For example, the UE (e.g., using antenna 252, DEMOD 254, MIMO detector 256, receive processor 258, controller/processor 280, and/or the like) may perform a beam management procedure, during a time period that follows the indication, based at least in part on receiving the indication and determining that the beam management configuration is outdated, as described above in connection with FIG. 9.

Method 1200 may include additional aspects, such as any single aspect or any combination of aspects described below and/or in connection with one or more other processes described elsewhere herein.

In some aspects, at least one receive beam of the UE is refined during the beam management procedure using at least one synchronization signal burst set or at least one set of channel state information reference signals (CSI-RS). In some aspects, the time period is longer than at least one of a period of a synchronization signal burst set or a period of periodic CSI-RS resources. In some aspects, the determination that the beam management configuration is outdated is based at least in part on a length of time that has elapsed since a most recent reference signal received power (RSRP) parameter was reported for the beam or an aperiodic CSI-RS resource set was transmitted for the beam.

In some aspects, the beam management procedure is performed based at least in part on an instruction from a base station to perform the beam management procedure. In some aspects, the beam is an uplink beam with a spatial relation or a downlink beam with a TCI state.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
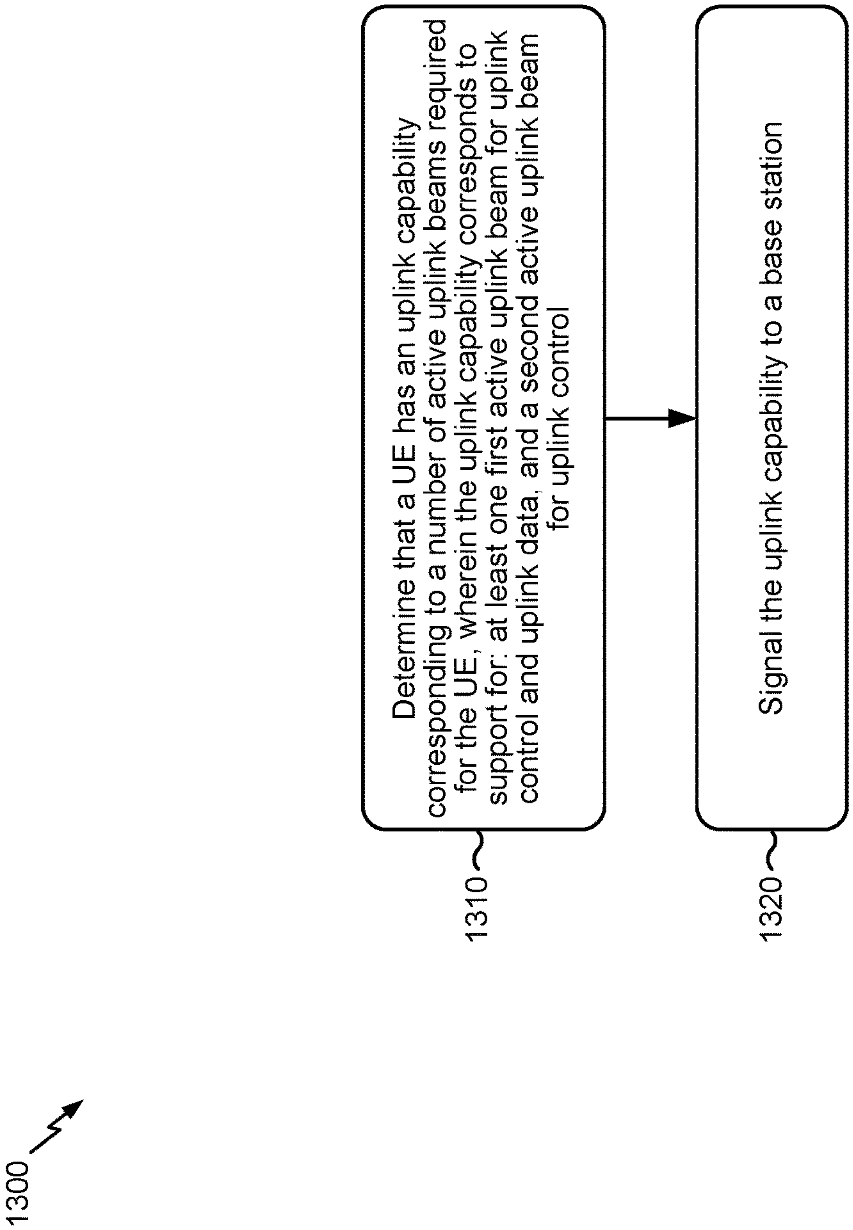

FIG. 13 is a diagram illustrating an example method 1300 performed, for example, by a UE, in accordance with various aspects of the present disclosure. Example method 1300 is an example where a UE (e.g., the UE 120, the apparatus 1502/1502', and/or the like) performs operations associated with active beam management, configuration, and capability signaling.

At 1310, the UE may determine that the UE has an uplink capability corresponding to a number of active uplink beams required for the UE, wherein the uplink capability corresponds to support for: at least one first active uplink beam for uplink control and uplink data, and a second active uplink beam for uplink control. For example, the UE (e.g., using controller/processor 280, memory 282, and/or the like) may determine that the UE has an uplink capability corresponding to a number of active uplink beams required for the UE, as described above. In some aspects, the uplink capability corresponds to support for: at least one first active uplink beam for uplink control and uplink data, and a second active uplink beam for uplink control.

At 1320, the UE may signal the uplink capability to a base station. For example, the UE (e.g., using transmit processor 264, controller/processor 280, memory 282, and/or the like) may signal the uplink capability to a base station, as described above.

Method 1300 may include additional aspects, such as any single aspect or any combination of aspects described below and/or in connection with one or more other processes described elsewhere herein.

In a first aspect, the second active uplink beam is not used for uplink data.

In a second aspect, alone or in combination with the first aspect, the uplink capability corresponds to a minimum downlink capability corresponding to a number of active downlink beams.

In a third aspect, alone or in combination with one or more of the first and second aspects, the uplink capability is signaled separately from a minimum downlink capability corresponding to a number of active downlink beams.

In a fourth aspect, alone or in combination with one or more of the first through third aspects, a common spatial relation is used for transmission across all uplink control resources and all uplink data resources.

In a fifth aspect, alone or in combination with one or more of the first through fourth aspects, the second active uplink beam depends on one of two active downlink control beams such that a spatial relation of the second active uplink beam is updated when a spatial relation of the one of the two active downlink control beams changes.

In a sixth aspect, alone or in combination with one or more of the first through fifth aspects, a spatial relation of the second active uplink beam maps to a transmission configuration indicator (TCI) state of the one of the two active downlink control beams that satisfies a condition.

In a seventh aspect, alone or in combination with one or more of the first through sixth aspects, the condition is that the one of the two active downlink control beams is associated with a downlink control identifier having a smaller identifier value, in a current bandwidth part, than the other of the two active downlink control beams.

In an eighth aspect, alone or in combination with one or more of the first through seventh aspects, the second active uplink beam is indicated to the UE in a MAC-CE, and the MAC-CE indicates a spatial relation, of the second active uplink beam, that maps to a transmission configuration indicator (TCI) state of the one of the two active downlink control beams.

In a ninth aspect, alone or in combination with one or more of the first through eighth aspects, the second active uplink beam does not depend on any active downlink control beams such that a spatial relation of the second active uplink beam is not updated when a transmission configuration indicator (TCI) state of any active downlink control beams changes.

In a tenth aspect, alone or in combination with one or more of the first through ninth aspects, two spatial relations are used for transmission across different uplink control resources, and one of the two spatial relations is used for transmission across different uplink data resources.

In an eleventh aspect, alone or in combination with one or more of the first through tenth aspects, the two active uplink beams are configured for uplink control, and each of the two active uplink beams depend on a respective one of two active downlink control beams.

In a twelfth aspect, alone or in combination with one or more of the first through eleventh aspects, each of the two active uplink beams depend on a respective one of the two active downlink control beams when the UE supports beam correspondence between uplink beams and downlink beams.

In a thirteenth aspect, alone or in combination with one or more of the first through twelfth aspects, a spatial relation of a first active uplink beam, of the two active uplink beams, maps to a transmission configuration indicator (TCI) state of a first active downlink control beam of the two active downlink control beams.

In a fourteenth aspect, alone or in combination with one or more of the first through thirteenth aspects, the first active uplink beam is associated with a smaller spatial relation identifier between the two active uplink beams, and the first active downlink control beam is associated with a downlink control identifier having a smaller identifier value, in a current bandwidth part, between the two active downlink control beams.

In a fifteenth aspect, alone or in combination with one or more of the first through fourteenth aspects, the two active uplink beams are indicated to the UE in a MAC-CE, and the MAC-CE indicates at least a first spatial relation, of a first active uplink beam of the two active uplink beams, that maps to a transmission configuration indicator (TCI) state of a first active downlink control beam of the two active downlink control beams.

In a sixteenth aspect, alone or in combination with one or more of the first through fifteenth aspects, the two active uplink beams do not depend on two active downlink control beams supported by the UE for a minimum capability corresponding to a number of active downlink beams.

In a seventeenth aspect, alone or in combination with one or more of the first through sixteenth aspects, the two active uplink beams do not depend on the two active downlink control beams when the UE does not have a capability to support beam correspondence between uplink beams and downlink beams.

In an eighteenth aspect, alone or in combination with one or more of the first through seventeenth aspects, the two active uplink beams are indicated to the UE in a medium access control (MAC) control element (CE).

In a nineteenth aspect, alone or in combination with one or more of the first through eighteenth aspects, the minimum capability is a capability to support two or more active uplink beams for all uplink control resources and all uplink data resources.

In a twentieth aspect, alone or in combination with one or more of the first through nineteenth aspects, two or more spatial relations are configured for transmission across different uplink control resources and uplink data resources.

In a twenty-first aspect, alone or in combination with one or more of the first through twentieth aspects, the number of active uplink beams includes an uplink beam determined based at least in part on a random access procedure in addition to one or more active uplink beams determined in a connected mode.

Although FIG. 13 shows example blocks of method 1300, in some aspects, method 1300 may include additional blocks, fewer blocks, different blocks, or differently arranged blocks than those depicted in FIG. 13. Additionally, or alternatively, two or more of the blocks of method 1300 may be performed in parallel.

Figure 14:
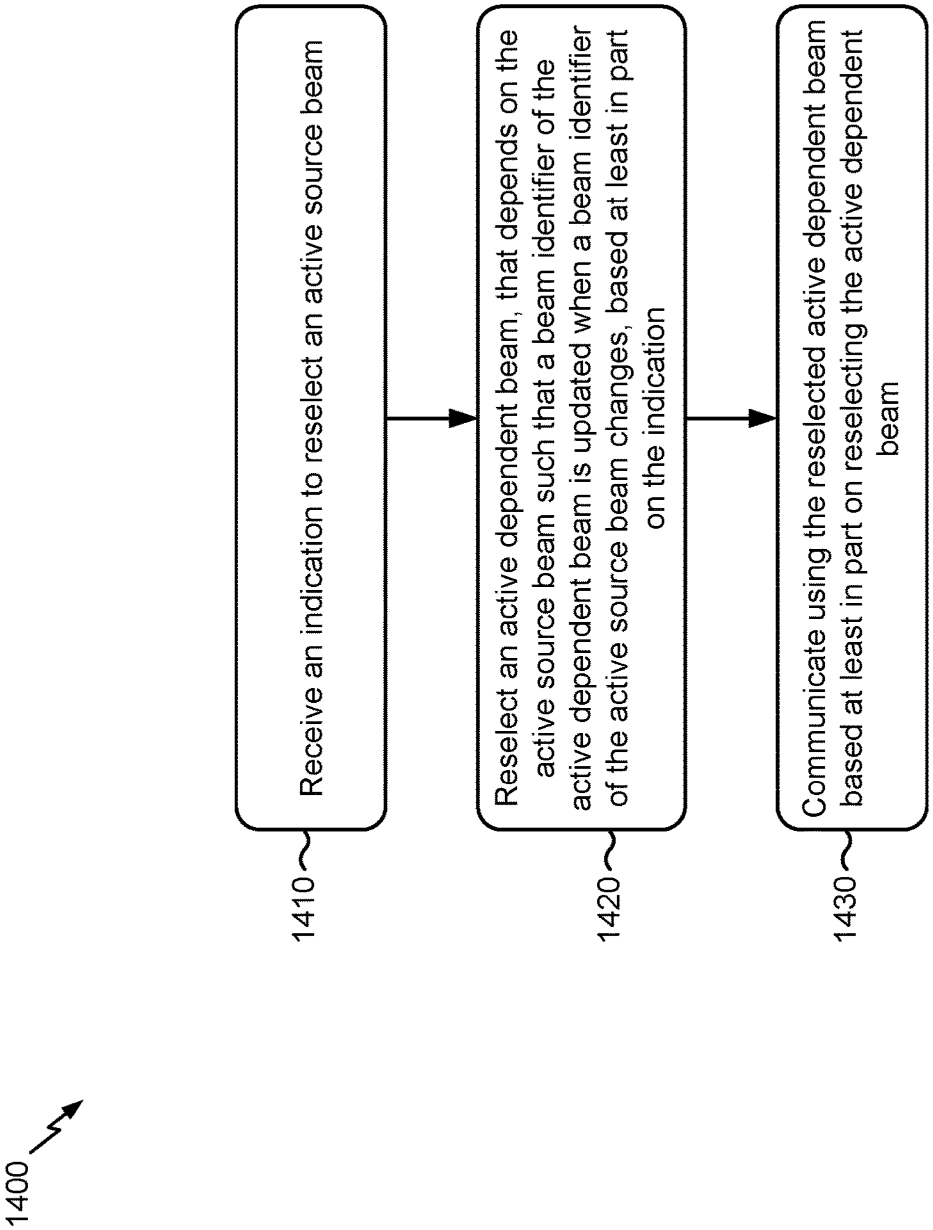

FIG. 14 is a diagram illustrating an example method 1400 performed, for example, by a UE, in accordance with various aspects of the present disclosure. Example method 1400 is an example where a UE (e.g., the UE 120, the apparatus 1502/1502', and/or the like) performs operations associated with active beam management, configuration, and capability signaling.

At 1410, the UE may receive an indication to reselect an active source beam. For example, the UE (e.g., using receive processor 258, controller/processor 280, memory 282, and/or the like) may receive an indication to reselect an active source beam, as described above.

At 1420, the UE may reselect an active dependent beam, that depends on the active source beam such that a beam identifier of the active dependent beam is updated when a beam identifier of the active source beam changes, based at least in part on the indication. For example, the UE (e.g., using receive processor 258, transmit processor 264, controller/processor 280, memory 282, and/or the like) may reselect an active dependent beam, that depends on the active source beam such that a beam identifier of the active dependent beam is updated when a beam identifier of the active source beam changes, based at least in part on the indication, as described above.

At 1430, the UE may communicate using the reselected active dependent beam based at least in part on reselecting the active dependent beam. For example, the UE (e.g., using receive processor 258, transmit processor 264, controller/processor 280, memory 282, and/or the like) may communicate using the reselected active dependent beam based at least in part on reselecting the active dependent beam, as described above.

Method 1400 may include additional aspects, such as any single aspect or any combination of aspects described below and/or in connection with one or more other processes described elsewhere herein.

In a first aspect, the active source beam is an active downlink control beam and the active dependent beam is an active downlink data beam, the active source beam is an active downlink control beam and the active dependent beam is an active uplink control beam, the active source beam is an active downlink data beam and the active dependent beam is an active uplink control beam, the active source beam is an active downlink data beam and the active dependent beam is an active uplink data beam, the active source beam is an active downlink control beam and the active dependent beam is an active uplink data beam, or the active source beam is an active uplink control beam and the active dependent beam is an active uplink data beam.

In a second aspect, alone or in combination with the first aspect, the indication is received in a MAC-CE received from a base station.

In a third aspect, alone or in combination with one or more of the first and second aspects, reselection of the active dependent beam is triggered by the indication to reselect the active source beam.

In a fourth aspect, alone or in combination with one or more of the first through third aspects, a single MAC-CE is used to signal reselection of both the active source beam and the active dependent beam.

In a fifth aspect, alone or in combination with one or more of the first through fourth aspects, the active dependent beam is reselected based at least in part on an explicit indication to reselect the active dependent beam.

In a sixth aspect, alone or in combination with one or more of the first through fifth aspects, a first MAC-CE is used to signal reselection of the active source beam, and a second MAC-CE is used to signal reselection of the active dependent beam.

In a seventh aspect, alone or in combination with one or more of the first through sixth aspects, the first MAC-CE and the second MAC-CE are included in a same downlink data communication.

In an eighth aspect, alone or in combination with one or more of the first through seventh aspects, the first MAC-CE and the second MAC-CE are acknowledged or negatively acknowledged together.

In a ninth aspect, alone or in combination with one or more of the first through eighth aspects, the first MAC-CE and the second MAC-CE are included in different downlink data communications.

In a tenth aspect, alone or in combination with one or more of the first through ninth aspects, communications of the UE are not scheduled on the active dependent beam, prior to reselecting the active dependent beam, for a time period where the active source beam has been reselected and the active dependent beam has not yet been reselected.

In an eleventh aspect, alone or in combination with one or more of the first through tenth aspects, the first MAC-CE and the second MAC-CE are acknowledged or negatively acknowledged separately.

Although FIG. 14 shows example blocks of method 1400, in some aspects, method 1400 may include additional blocks, fewer blocks, different blocks, or differently arranged blocks than those depicted in FIG. 14. Additionally, or alternatively, two or more of the blocks of method 1400 may be performed in parallel.

Figure 15:
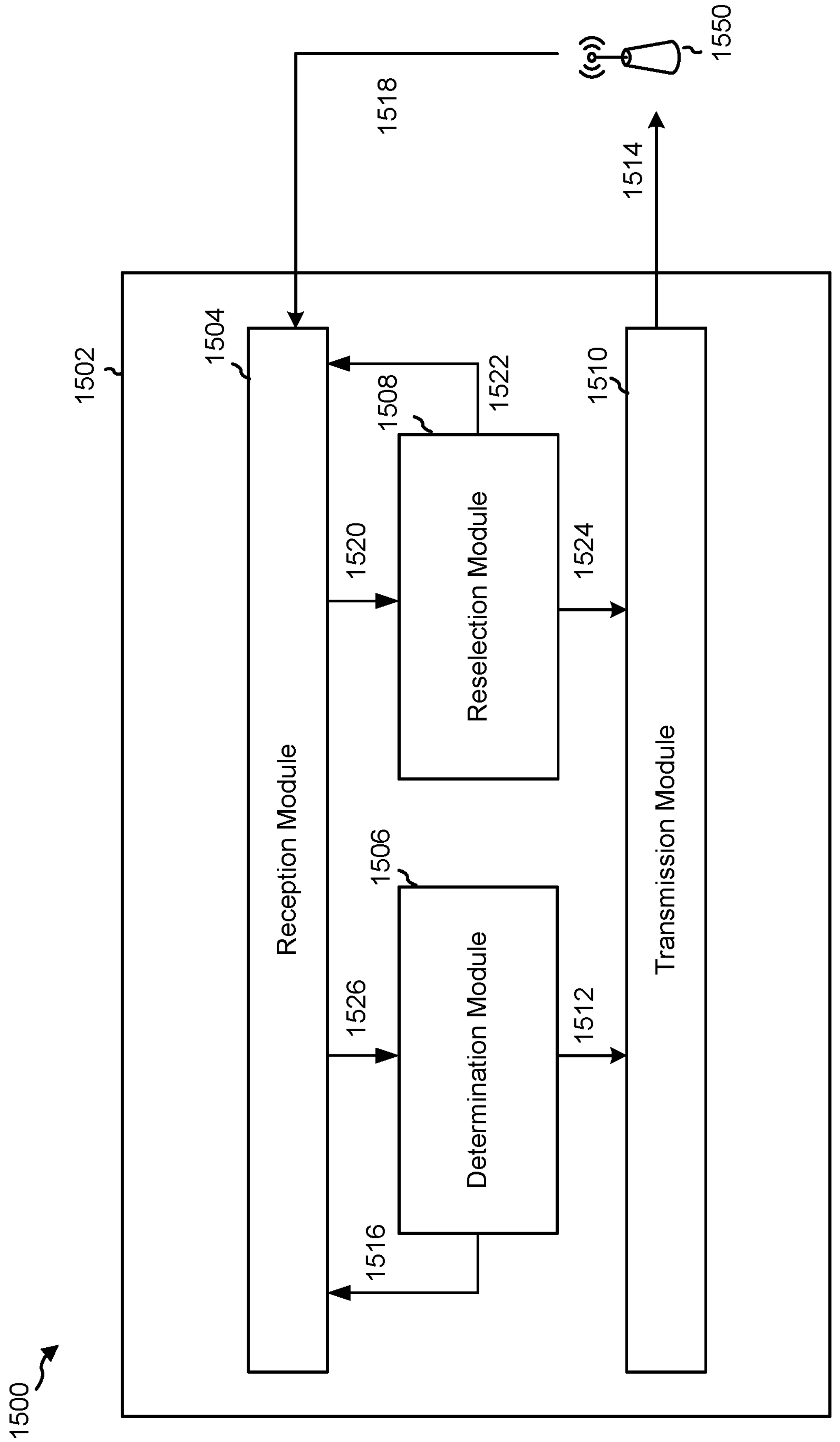
FIG. 15 is a conceptual data flow diagram illustrating the data flow between different modules/means/components in an example apparatus.

FIG. 15 is a conceptual data flow diagram 1500 illustrating the data flow between different modules/means/components in an example apparatus 1502. The apparatus 1502 may be a UE. In some aspects, the apparatus 1502 includes a reception module 1504, a determination module 1506, a reselection module 1508, and/or a transmission module 1510.

In some aspects, the determination module 1506 may determine that the apparatus 1502 has a minimum capability corresponding to a number of active uplink beams supported by the apparatus 1502, and may indicate such minimum capability to the transmission module 1510 as information 1512. The transmission module 1510 may signal the minimum capability corresponding to the number of active uplink beams to a base station 1550 as information 1514. Additionally, or alternatively, the determination module 1506 may indicate such minimum capability to the reception module 1504 as information 1516, and the reception module 1504 may use such information to communicate with the base station 1550 using information 1518.

Additionally, or alternatively, the reception module 1504 may receive, from the base station 1550 as information 1518, an indication to reselect an active source beam. The reception module 1504 may provide information regarding the indication to the reselection module 1508 as information 1520. The reselection module 1508 may reselect the active source beam and/or an active dependent beam, that depends on the active source beam, based at least in part on the indication. The reselection module 1508 may provide information regarding such reselection to the reception module 1504 as information 1522 and/or to the transmission module 1510 as information 1524. The reception module 1504 and/or the transmission module 1510 may communicate with the base station 110 using the reselected active source beam and/or the reselected active dependent beam based at least in part on such information.

Additionally, or alternatively, the reception module 1504 may receive, from the base station 1550 as information 1518, an indication to activate a beam. The reception module 1504 may provide information regarding the indication to the determination module 1506 as information 1526. The determination module 1506 may determine that a beam management configuration is outdated for the apparatus 1502, and may provide an indication regarding the outdated beam management configuration to the reception module 1504 as information 1516. The reception module 1506 and/or the determination module 1506 may perform a beam management procedure (e.g., using information 1518 from the base station 1550), during a time period that follows the indication.

The apparatus may include additional modules that perform each of the blocks of the algorithm in the aforementioned method 1000 of FIG. 10, method 1100 of FIG. 11, method 1200 of FIG. 12, method 1300 of FIG. 13, method 1400 of FIG. 14, and/or the like. As such, each block in the aforementioned method 1000 of FIG. 10, method 1100 of FIG. 11, method 1200 of FIG. 12, method 1300 of FIG. 13, method 1400 of FIG. 14, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 15 are provided as an example. In practice, there may be additional modules, fewer modules, different modules, or differently arranged modules than those shown in FIG. 15. Furthermore, two or more modules shown in FIG. 15 may be implemented within a single module, or a single module shown in FIG. 15 may be implemented as multiple, distributed modules. Additionally, or alternatively, a set of modules (e.g., one or more modules) shown in FIG. 15 may perform one or more functions described as being performed by another set of modules shown in FIG. 15.

Figure 16:
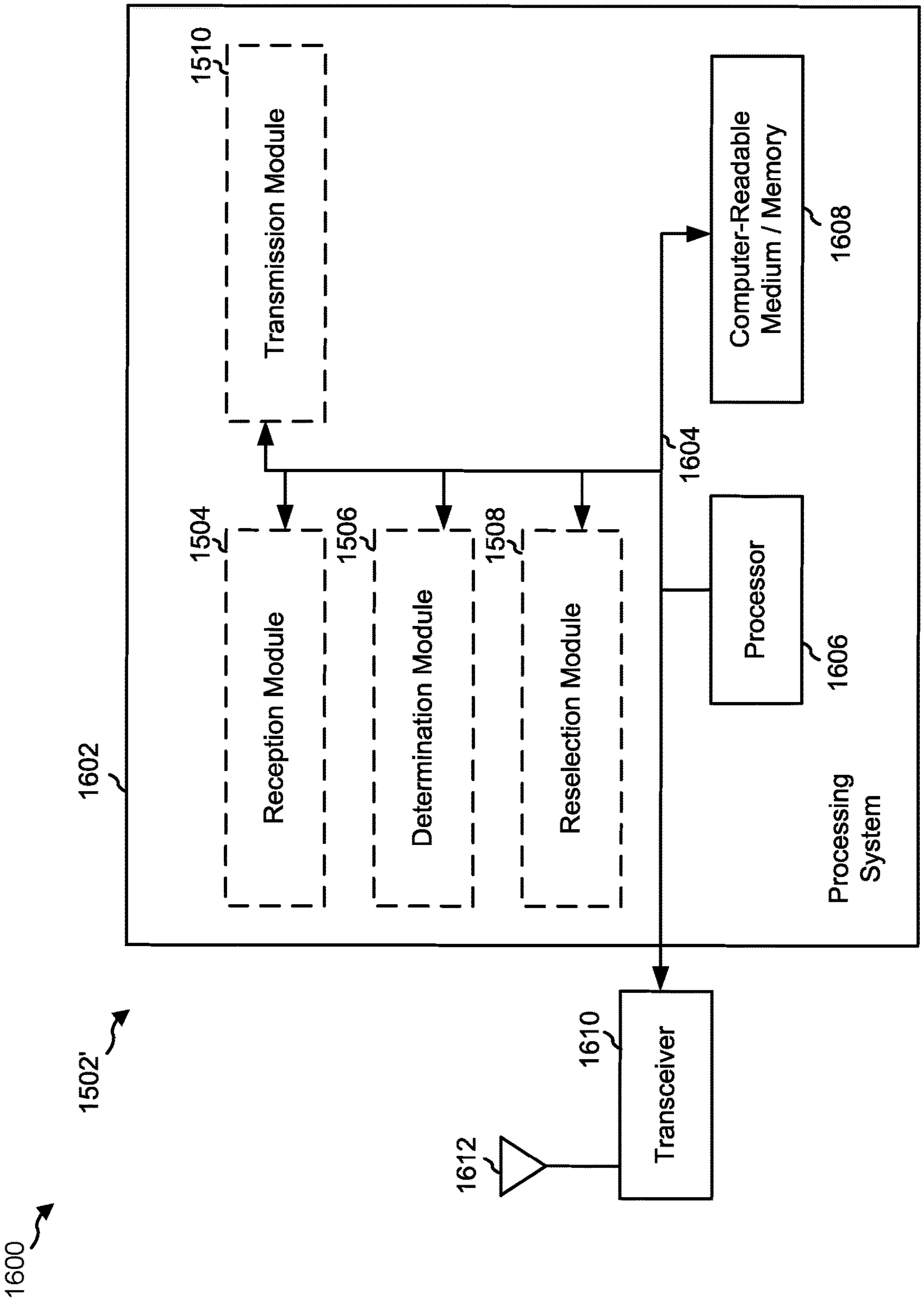
FIG. 16 is a diagram illustrating an example of a hardware implementation for an apparatus employing a processing system.

FIG. 16 is a diagram 1600 illustrating an example of a hardware implementation for an apparatus 1502' employing a processing system 1602. The apparatus 1502' may be a UE.

The processing system 1602 may be implemented with a bus architecture, represented generally by the bus 1604. The bus 1604 may include any number of interconnecting buses and bridges depending on the specific application of the processing system 1602 and the overall design constraints. The bus 1604 links together various circuits including one or more processors and/or hardware modules, represented by the processor 1606, the modules 1504, 1506, 1508, and/or 1510, and the computer-readable medium/memory 1608. The bus 1604 may also link various other circuits such as timing sources, peripherals, voltage regulators, and power management circuits, which are well known in the art, and therefore, will not be described any further.

The processing system 1602 may be coupled to a transceiver 1610. The transceiver 1610 is coupled to one or more antennas 1612. The transceiver 1610 provides a means for communicating with various other apparatuses over a transmission medium. The transceiver 1610 receives a signal from the one or more antennas 1612, extracts information from the received signal, and provides the extracted information to the processing system 1602, specifically the reception module 1504. In addition, the transceiver 1610 receives information from the processing system 1602, specifically the transmission module 1510, and based at least in part on the received information, generates a signal to be applied to the one or more antennas 1612. The processing system 1602 includes a processor 1606 coupled to a computer-readable medium/memory 1608. The processor 1606 is responsible for general processing, including the execution of software stored on the computer-readable medium/memory 1608. The software, when executed by the processor 1606, causes the processing system 1602 to perform the various functions described above for any particular apparatus. The computer-readable medium/memory 1608 may also be used for storing data that is manipulated by the processor 1606 when executing software. The processing system further includes at least one of the modules 1504, 1506, 1508, and/or 1510. The modules may be software modules running in the processor 1606, resident/stored in the computer readable medium/memory 1608, one or more hardware modules coupled to the processor 1606, or some combination thereof. The processing system 1602 may be a component of the UE 120 and may include the memory 282 and/or at least one of the TX MIMO processor 266, the RX processor 258, and/or the controller/processor 280.

In some aspects, the apparatus 1502/1502' for wireless communication may include means for determining that the apparatus has an uplink capability corresponding to a number of active uplink beams required for the apparatus, wherein the uplink capability corresponds to support for: at least one first active uplink beam for uplink control and uplink data, and a second active uplink beam for uplink control; means for signaling the uplink capability to a base station; and/or the like. Additionally, or alternatively, the apparatus 1502/1502' for wireless communication may include means for receiving an indication to reselect an active source beam; means for reselecting an active dependent beam, that depends on the active source beam such that a beam identifier of the active dependent beam is updated when a beam identifier of the active source beam changes, based at least in part on the indication; and means for communicating using the reselected active dependent beam based at least in part on reselecting the active dependent beam. Additionally, or alternatively, the apparatus 1502/1502' for wireless communication may include means for determining that the UE has a minimum capability corresponding to a number of active uplink beams supported by the UE; means for signaling the minimum capability to a base station; and/or the like. Additionally, or alternatively, the apparatus 1502/1502' for wireless communication may include means for receiving an indication to reselect an active source beam; means for reselecting an active dependent beam, that depends on the active source beam, based at least in part on the indication; means for communicating using the reselected active dependent beam based at least in part on reselecting the active dependent beam; and/or the like. Additionally, or alternatively, the apparatus 1502/1502' for wireless communication may include means for receiving an indication to activate a beam; means for determining that a beam management configuration is outdated for the UE; means for performing a beam management procedure, during a time period that follows the indication, based at least in part on receiving the indication and determining that the beam management configuration is outdated; and/or the like.

The aforementioned means may be one or more of the aforementioned modules of the apparatus 1502 and/or the processing system 1602 of the apparatus 1502' configured to perform the functions recited by the aforementioned means. As described above, the processing system 1602 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 16 is provided as an example. Other examples may differ from what is described in connection with FIG. 16.

It should be understood that the specific order or hierarchy of blocks in the processes/flow charts disclosed is an illustration of example approaches. Based upon design preferences, it should be understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
- receiving a medium access control (MAC) control element (CE) (MAC-CE) to activate a beam;
- transmitting an acknowledgement of the MAC-CE;
- refining, after the acknowledgement of the MAC-CE and after an activation latency period, the beam during a non-schedulable period,
  - wherein the activation latency period begins when the acknowledgment is transmitted, and
  - wherein scheduling, of communications for the UE on the beam, is refrained during the non-schedulable period; and
- communicating using the beam after refining the beam.

2. The method of claim 1, wherein the beam is a receive beam.

3. The method of claim 1, wherein the activation latency period is 3 milliseconds.

4. The method of claim 1, wherein the beam is refined using at least one of a synchronization signal burst set or a set of CSI-RS.

5. The method of claim 4, wherein the non-schedulable period is longer than a period of the synchronization signal burst set.

6. The method of claim 4, wherein the non-schedulable period is longer than a period of periodic CSI-RS resources.

7. The method of claim 1, wherein the beam is refined based at least in part on a threshold period of time elapsing between a beam management procedure performed on the beam and the receiving of the MAC-CE.

8. The method of claim 1, further comprising:
- reporting a reference signal received power (RSRP) parameter for the beam; and
- wherein refining the beam comprises:
  - refining the beam based at least in part on a threshold period of time elapsing after the reporting of the RSRP parameter.

9. An apparatus for wireless communication at a user equipment (UE), comprising:
- one or more memories; and
- one or more processors coupled to the one or more memories, the one or more processors individually or collectively configured to cause the UE to:
  - receive a medium access control (MAC) control element (CE) (MAC-CE) to activate a beam;
  - transmit an acknowledgement of the MAC-CE;
  - refine, after the acknowledgement of the MAC-CE and after an activation latency period, the beam during a non-schedulable period,
    - wherein the activation latency period begins when the acknowledgment is transmitted, and
    - wherein scheduling, of communications for the UE on the beam, is refrained during the non-schedulable period; and
  - communicate using the beam after refining the beam.

10. The apparatus of claim 9, wherein the beam is a receive beam.

11. The apparatus of claim 9, wherein the activation latency period is 3 milliseconds.

12. The apparatus of claim 9, wherein the one or more processors, to cause the UE to refine the beam, are configured to cause the UE to:
- refine the beam using at least one of a synchronization signal burst set or a set of CSI-RS.

13. The apparatus of claim 12, wherein the non-schedulable period is longer than a period of the synchronization signal burst set.

14. The apparatus of claim 12, wherein the non-schedulable period is longer than a period of periodic CSI-RS resources.

15. The apparatus of claim 9, wherein the one or more processors, to cause the UE to refine the beam, are configured to cause the UE to:
- refine the beam based at least in part on a threshold period of time elapsing between a beam management procedure performed on the beam and the reception of the MAC-CE.

16. The apparatus of claim 9, wherein the one or more processors are further configured to cause the UE to:
- report a reference signal received power (RSRP) parameter for the beam; and
- wherein the one or more processors, to cause the UE to refine the beam, are configured to cause the UE to:
  - refine the beam based at least in part on a threshold period of time elapsing after the reporting of the RSRP parameter.

17. A non-transitory computer-readable medium storing a set of instructions for wireless communication, the set of instructions comprising:
- one or more instructions that, when executed by one or more processors of a user equipment (UE), cause the UE to:

receive a medium access control (MAC) control element (CE) (MAC-CE) to activate a beam;

transmit an acknowledgement of the MAC-CE;

refine, after acknowledgement of the MAC-CE and after an activation latency period, the beam during a non-schedulable period, wherein the activation latency period begins when the acknowledgment is transmitted, and wherein scheduling, of communications for the UE on the beam, is refrained during the non-schedulable period; and communicate using the beam after refining the beam.

18. The non-transitory computer-readable medium of claim 17, wherein the beam is a receive beam.

19. The non-transitory computer-readable medium of claim 17, wherein the activation latency period is 3 milliseconds.

20. The non-transitory computer-readable medium of claim 17, wherein the one or more instructions, that cause the UE to refine the beam, cause the UE to:

refine the beam using at least one of a synchronization signal burst set or a set of CSI-RS.

21. The non-transitory computer-readable medium of claim 20, wherein the non-schedulable period is longer than a period of the synchronization signal burst set.

22. The non-transitory computer-readable medium of claim 20, wherein the non-schedulable period is longer than a period of periodic CSI-RS resources.

23. The non-transitory computer-readable medium of claim 17, wherein the one or more instructions, that cause the UE to refine the beam, cause the UE to:

refine the beam based at least in part on a threshold period of time elapsing between a beam management procedure performed on the beam and the reception of the MAC-CE.

24. The non-transitory computer-readable medium of claim 17, wherein the one or more instructions further cause the UE to:

report a reference signal received power (RSRP) parameter for the beam; and wherein the one or more instructions, that cause the UE to refine the beam, cause the UE to:

refine the beam based at least in part on a threshold period of time elapsing after the reporting of the RSRP parameter.

25. An apparatus for wireless communication, comprising:

means for receiving a medium access control (MAC) control element (CE) (MAC-CE) to activate a beam;

means for transmitting an acknowledgement of the MAC-CE;

means for refining, after acknowledgement of the MAC-CE and after an activation latency period, the beam during a non-schedulable period, wherein the activation latency begins when the acknowledgment is transmitted, and wherein scheduling, of communications for the apparatus on the beam, is refrained during the non-schedulable period; and means for communicating using the beam after refining the beam.

26. The apparatus of claim 25, wherein the means for refining the beam comprises:

means for refining the beam using at least one of a synchronization signal burst set or a set of CSI-RS.

27. The apparatus of claim 26, wherein the non-schedulable period is longer than a period of the synchronization signal burst set.

28. The apparatus of claim 26, wherein the non-schedulable period is longer than a period of periodic CSI-RS resources.

29. The apparatus of claim 25, wherein the means for refining the beam comprises:

means for refining the beam based at least in part on a threshold period of time elapsing between a beam management procedure performed on the beam and the reception of the MAC-CE.

30. The apparatus of claim 25, further comprising:

means for reporting a reference signal received power (RSRP) parameter for the beam; and wherein the means for refining the beam comprises:

means for refining the beam based at least in part on a threshold period of time elapsing after the reporting of the RSRP parameter.

* * * * *